(12) United States Patent
Kitazumi et al.

(10) Patent No.: US 7,434,678 B1
(45) Date of Patent: Oct. 14, 2008

(54) SYSTEMS AND METHODS FOR TRANSPORT THROUGH CURVED CONVEYANCE SECTIONS

(75) Inventors: Barry Kitazumi, Milpitas, CA (US); Benjamin T. Davidson, Fond du Lac, WI (US)

(73) Assignee: Aquest Systems Corporation, Sunnyvale, CA (US)

( * ) Notice: Subject to any disclaimer, the term of this patent is extended or adjusted under 35 U.S.C. 154(b) by 0 days.

(21) Appl. No.: 11/900,482

(22) Filed: Sep. 11, 2007

Related U.S. Application Data

(63) Continuation-in-part of application No. 11/818,657, filed on Jun. 14, 2007.

(51) Int. Cl.
*B65G 15/12* (2006.01)
*B65G 21/16* (2006.01)

(52) U.S. Cl. .................... 198/623; 198/817; 198/604; 198/465.3

(58) Field of Classification Search .............. 198/465.3, 198/304, 623, 817, 831
See application file for complete search history.

(56) References Cited

U.S. PATENT DOCUMENTS

| | | | |
|---|---|---|---|
| 3,105,334 A | 10/1963 | Marshall | |
| 3,380,459 A * | 4/1968 | Schmermund | ............... 131/94 |
| 3,570,684 A | 3/1971 | Cowan | |
| 3,976,202 A | 8/1976 | Bauvin | |
| 4,217,977 A | 8/1980 | Tam | |
| 4,479,572 A * | 10/1984 | Merz | ....................... 198/345.3 |
| 4,779,715 A | 10/1988 | Pazdernik | |
| 4,817,781 A | 4/1989 | Folk | |
| 5,884,753 A * | 3/1999 | Robertson et al. | ........ 198/803.2 |
| 5,951,016 A | 9/1999 | Bateman | |
| 6,280,134 B1 | 8/2001 | Nering | |
| 6,308,818 B1 * | 10/2001 | Bonora et al. | ............ 198/465.1 |
| 6,390,282 B1 | 5/2002 | Ouellette | |
| 6,533,104 B1 | 3/2003 | Starlinger-Huemer | |
| 6,848,882 B2 | 2/2005 | Chen | |
| 6,889,817 B2 * | 5/2005 | Leisner | .................... 198/465.2 |
| 7,281,623 B1 * | 10/2007 | Kitazumi et al. | ............ 198/799 |
| 2002/0119036 A1 | 8/2002 | Huber | |
| 2006/0257233 A1 | 11/2006 | Bonora | |

* cited by examiner

*Primary Examiner*—Mark A Deuble
(74) *Attorney, Agent, or Firm*—Carr & Ferrell LLP

(57) ABSTRACT

A transport system includes a curved conveyance section configured to move an article along a curved path without significantly slowing or stopping. Exemplary articles for conveyance include semiconductor wafers and substrates for display devices and photovoltaic devices. In some embodiments, the conveyance section includes a turnstile wheel including an interior surface and an exterior surface. The external surface is configured to guide an exterior belt that in turn supports one side of the article around the conveyance path. The internal surface is configured to either support an opposing side of the article, or guide an interior belt that in turn supports the article around the conveyance path. Instead of employing a turnstile wheel, other embodiments employ interior and exterior supports for supporting opposite ends of the article, such as interior and exterior belts, that move at essentially the same angular rate along the inside and outside of the conveyance path.

25 Claims, 16 Drawing Sheets

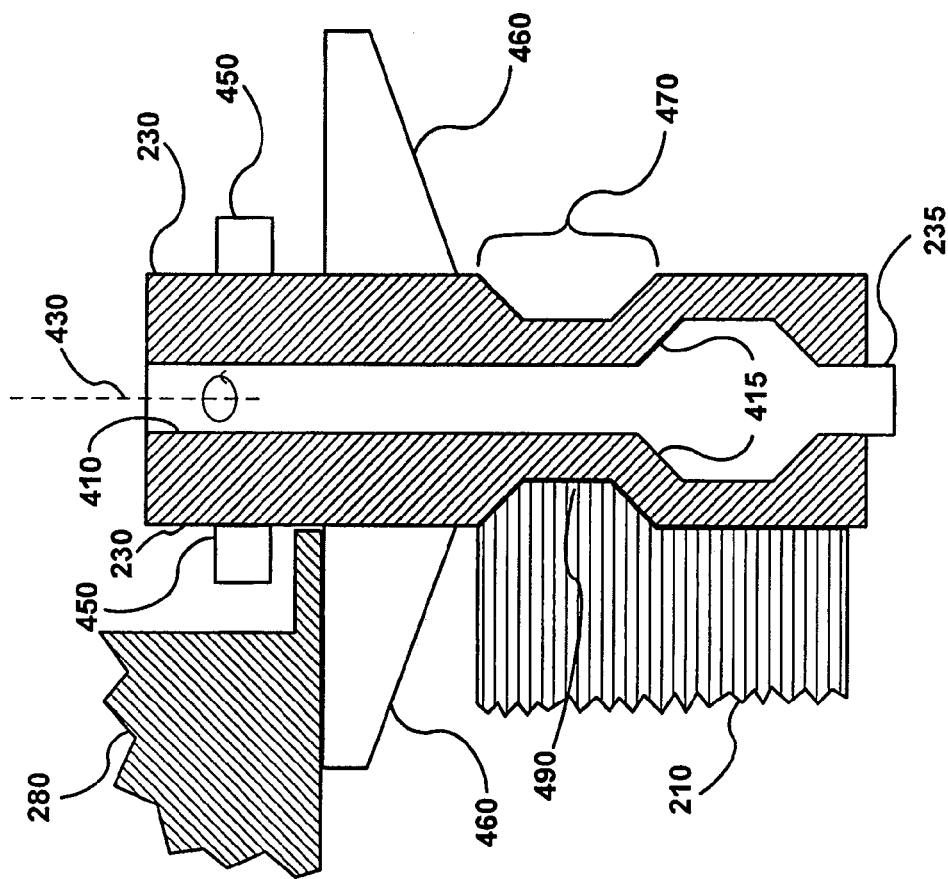
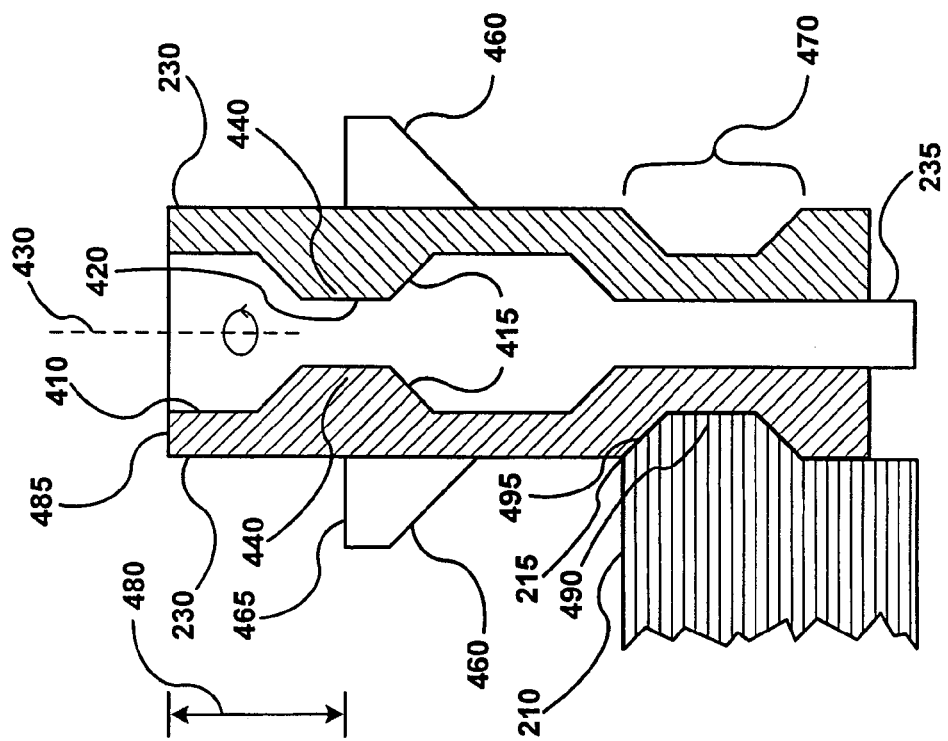
FIG. 4B
FIG. 4A

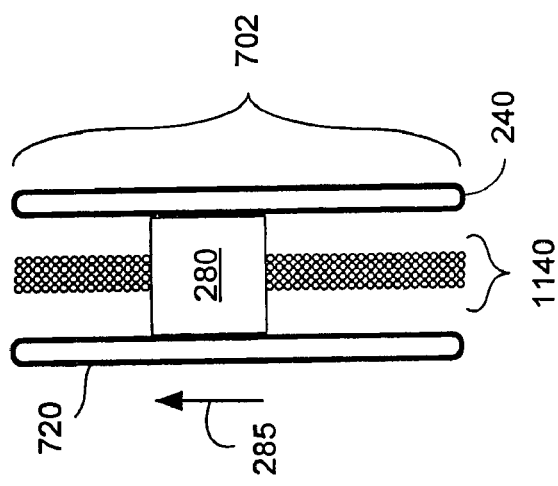
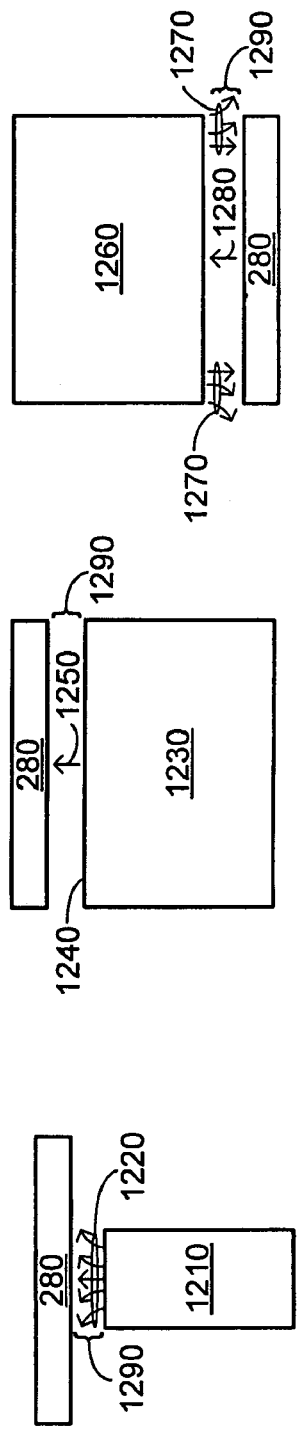
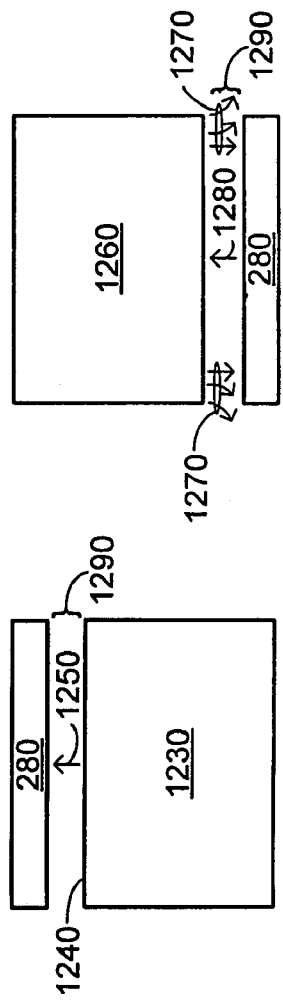
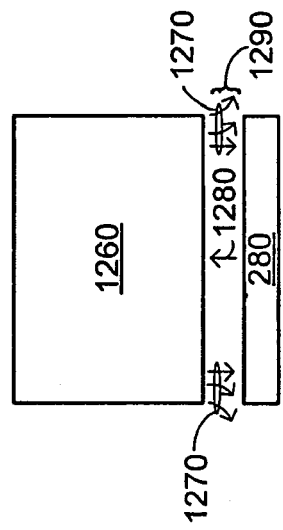

SYSTEMS AND METHODS FOR TRANSPORT THROUGH CURVED CONVEYANCE SECTIONS

CROSS-REFERENCE TO RELATED APPLICATIONS

This application is a continuation-in-part of co-pending U.S. application Ser. No. 11/818,657 entitled "Systems and Methods for Transport Through Curves" filed on Jun. 14, 2007, which is incorporated herein by reference.

BACKGROUND OF THE INVENTION

1. Field of the Invention

The present invention relates generally to transport systems and methods for conveying articles along a conveyance path, and in some embodiments to conveying semiconductor substrates, or the like, in a fabrication facility.

2. Description of Related Art

Transport systems are widely employed in industrial manufacturing facilities to convey articles between work stations. Originally, these systems were manual and workers moved articles by hand or by cart. Modern factories have developed specialized equipment to convey articles automatically. In particular, semiconductor fabrication facilities currently use automated transport systems to move semiconductor wafers during the manufacturing process. Typically, a batch of wafers may be conveyed together in a container known as a Front Opening Unified Pod (FOUP). Semiconductor wafer manufacturers have sought to increase manufacturing productivity by using transport systems that quickly and efficiently convey wafers from machine to machine without exposing the wafers to excessive contamination, excessive vibration, or excessive acceleration and deceleration forces. One problem with existing transport systems used in the semiconductor manufacturing industry is the difficulty of changing or turning the direction of conveyance of an article, such as a FOUP, without momentarily stopping its forward motion. This wait leads to a bottleneck that limits the throughput and efficiency of such transport systems.

FIG. 1A illustrates a top view of a prior art transport cornering system. This system comprises a conveyor 110 including a belt 111 and a belt 112, and a conveyor 120 including a belt 121 and a belt 122. This system also comprises a turntable 130 configured to receive an article 140 from conveyor 110, rotate the article 140, and deliver the article 140 to conveyor 120. The turntable 130 comprises a belt 131 and a belt 132 on either side of the turntable 130, and an axis of rotation 133. A corner region 160 is shown magnified in FIG. 1B, FIG. 1C, and FIG. 1D to show the turntable 130 in successive stages of rotation as it delivers the article 140 from conveyor 110 to conveyor 120. The conveyor 110 uses the belt 111 and the belt 112 to transport the article 140 toward the turntable 130, where the article 140 is turned and delivered to the conveyor 120. The axis of rotation 133 is typically disposed between the belt 131 and the belt 132 on the turntable 130. Thus, a conveyance path of the article 140 passes through the axis of rotation 133.

When the article 140 reaches the corner region 160 and is approximately centered over the axis of rotation 133, the article 140 typically stops while the turntable 130 rotates to position the article 140 such that it may be delivered to the conveyor 120. The turntable 130 typically has a capacity to carry only one article 140 at a given time. The distance traveled per unit time by the article 140 through the corner region 160 is typically lower than the distance traveled per unit time by the article 140 over the conveyor 110 or the conveyor 120. To compensate for this, space is allocated between adjacent articles 140 on conveyors 110 and 120. As a result, the corner region 160 typically becomes a bottleneck in a transport system. Therefore, there is a need for improved systems and methods for changing or turning the direction of conveyance of articles in manufacturing facilities.

SUMMARY OF THE INVENTION

The present invention comprises, in various embodiments, a transport system including a curved conveyance section configured for moving articles along a curved conveyance path. In various embodiments, the curved conveyance section comprises two approximately vertical belts referred to as an exterior corner belt and an interior corner belt. The exterior corner belt is disposed on an exterior edge of the curved conveyance path and the interior corner belt is disposed on an interior edge of the curved conveyance path. The exterior corner belt and the interior corner belt are typically continuously curved through the curved conveyance section.

In various embodiments, a turnstile wheel is configured to guide both the interior corner belt and the exterior corner belt around a common axis of rotation, e.g., an axis of rotation of the turnstile wheel. As further described herein, a path of each belt is determined by respective surfaces of the turnstile wheel. Because these surfaces of the turnstile wheel share the same axis of rotation, both the interior corner belt and the exterior corner belt are guided at essentially the same angular velocity. Further, because the surfaces of the turnstile wheel travel in a continuously curved path, both the interior corner belt and the exterior corner belt are guided in a continuously curved path.

The turnstile wheel is disposed partially under or over the conveyance path to guide the movement and/or the position of both the interior corner belt and the exterior corner belt. This configuration optionally allows the article conveyed to move through the curved conveyance section at a velocity approximately equal to a velocity at which the article approaches the curved conveyance section; e.g., the article can pass through the curved conveyance section without stopping and/or significantly slowing down. In some embodiments of the present invention, the curved conveyance section is configured to transport containers known as Front Opening Unified Pods (FOUPs) and/or substrates configured for the manufacture of a display device.

An exemplary conveyance section of the invention is configured to convey an article along a curved conveyance path bounded by an interior curve and an exterior curve. The conveyance section comprises an interior surface disposed proximate to a segment of the interior curve, an exterior corner belt supported by an external corner belt support structure, and a plurality of support protrusions disposed on the external corner belt and configured to support the article. The exterior corner belt is disposed proximate to a segment of the exterior curve. Additionally, the interior surface and the exterior corner belt are configured to guide therebetween the article along the curved conveyance path such that an angular velocity of a first side of the article proximate to the segment of the interior curve is approximately equal to an angular velocity of a second side of the article proximate to the segment of the exterior curve.

An exemplary conveyance section of the invention is configured to convey an article along a curved conveyance path bounded by an interior curve and an exterior curve. The conveyance section comprises an interior surface configured to rotate around an axis with an angular velocity, an exterior surface configured to rotate around the axis with the angular velocity, and an exterior corner belt supported by the exterior surface. The interior surface is disposed proximate to a segment of the interior curve, the exterior surface is disposed proximate to a segment of the exterior curve, and the exterior corner belt is disposed proximate to the segment of the exterior curve. The exterior corner belt and the interior surface are configured to guide therebetween the article along the curved conveyance path.

An exemplary transport system of the invention comprises a straight conveyance section including two belts configured to transport an article therebetween and a curved conveyance section. The curved conveyance section is configured to receive the article from the straight conveyance section and convey the article along a curved conveyance path bounded by an interior curve and an exterior curve. The curved conveyance section includes a turnstile wheel configured to rotate around an axis with an angular velocity. The turnstile wheel is configured to have an interior surface disposed proximate to a segment of the interior curve and an exterior surface disposed proximate to a segment of the exterior curve. Additionally, the curved conveyance section includes an exterior corner belt which is supported by the exterior surface and disposed proximate to the segment of the exterior curve.

An exemplary method of the invention for conveying an article along a curved conveyance path bounded by an interior curve and an exterior curve comprises rotating an interior surface with an angular velocity, rotating an exterior surface with the angular velocity, moving an exterior corner belt around a continuous loop, providing the article to an end of the conveyance path between the exterior corner belt and the interior surface, and guiding the article along the curved conveyance path. The interior surface is disposed proximate to a segment of the interior curve and the exterior surface is disposed proximate to a segment of the exterior curve. The exterior corner belt is supported by the exterior surface and disposed proximate to the segment of the exterior curve.

BRIEF DESCRIPTION OF THE DRAWINGS

For a more complete understanding of the present invention and for further features and advantages, reference is made to the following description taken in conjunction with the accompanying drawings, in which:

FIGS. 4A, 4B, 4C, and 4D illustrate cross-sectional views of alternative embodiments of an exterior corner belt, a turnstile wheel, and a plurality of exterior corner belt guide wheels, according to various embodiments of the invention;

FIG. 11 illustrates a top view of an entrance conveyance section configured to provide air bearings along an entrance conveyance path, according to various embodiments of the invention; and FIGS. 12A, 12B, and 12C illustrate cross-sectional views of air bearing generators configured to generate the air bearings illustrated in FIG. 11.

DETAILED DESCRIPTION OF THE INVENTION

Various embodiments of the present invention include improved systems and methods for automatically turning or changing the direction of conveyance of articles, such as FOUPs or substrates configured for the manufacture of a display device. For example, some embodiments include the use of vertical rollers and belts to efficiently propel articles along a conveyance path through a corner, thereby changing the direction of conveyance of the articles without stopping and/or significantly slowing the articles. Various embodiments also include the use of turnstile wheels configured to control the relative velocity of the vertical rollers and belts on either side of the conveyance path, and thus to propel the articles in a conveyance direction through a corner at an approximately constant velocity. In various embodiments, the corner includes gradual or sharp curves, for example between 1 and 180 degrees.

Figure 1A:
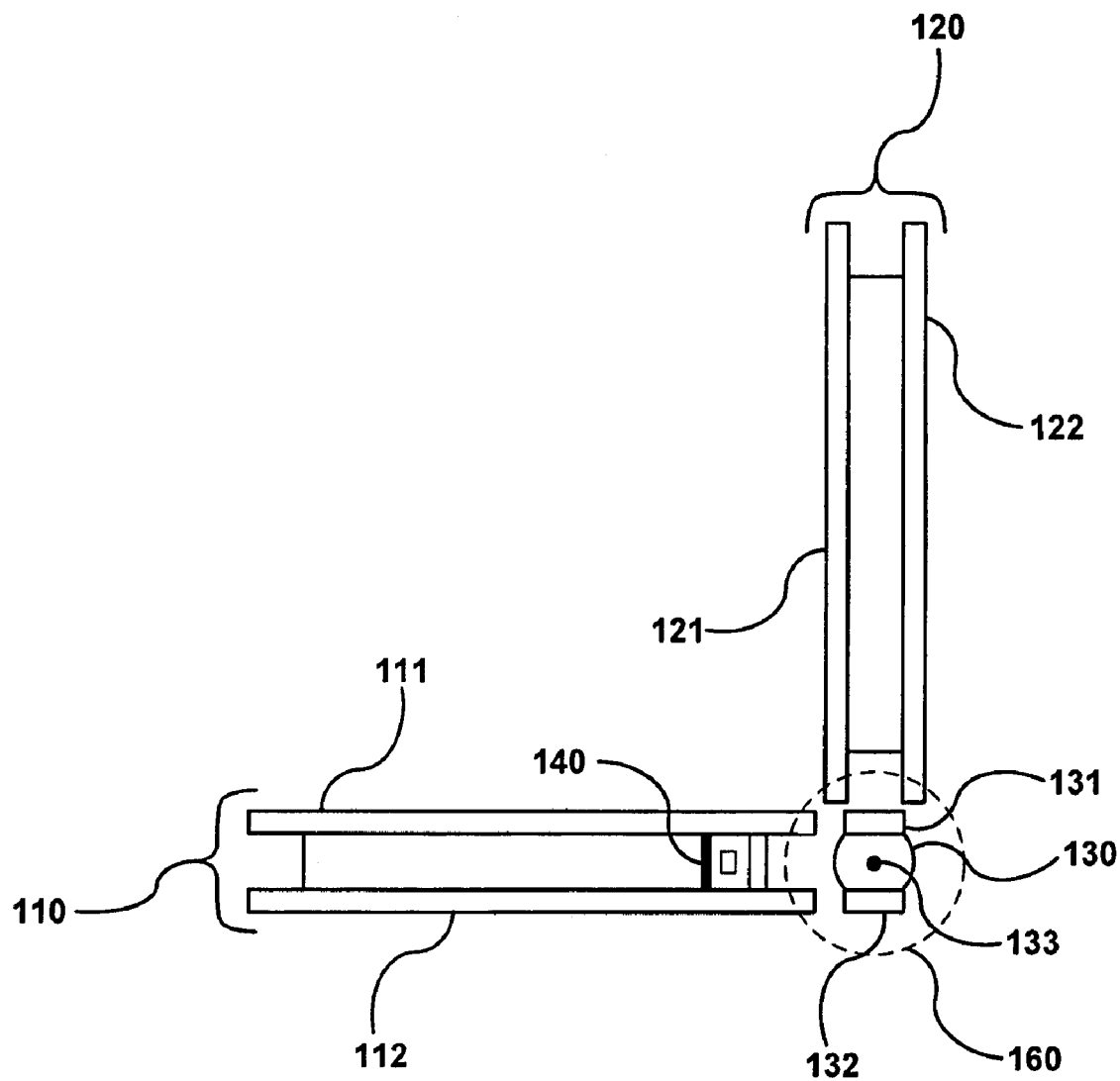
FIG. 1A illustrates a top view of a prior art transport cornering system.
Figure 1D:
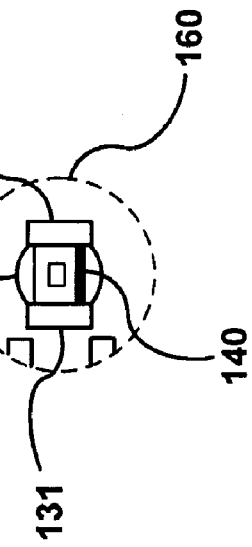
FIGS. 1B, 1C, and 1D illustrate a portion of FIG. 1A, showing an article in successive stages of rotation through a corner.
Figure 1C:
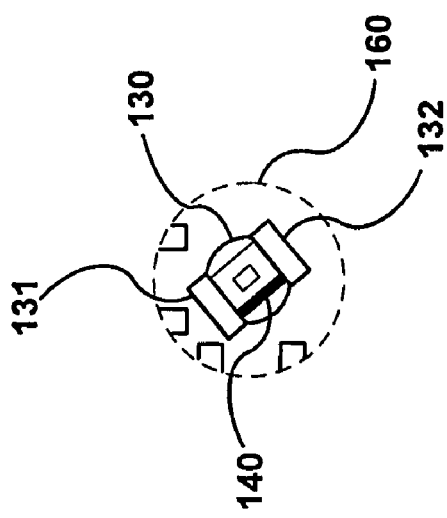
Figure 1B:
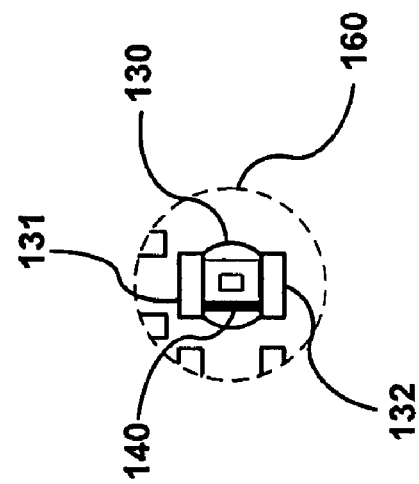
Figure 2A:
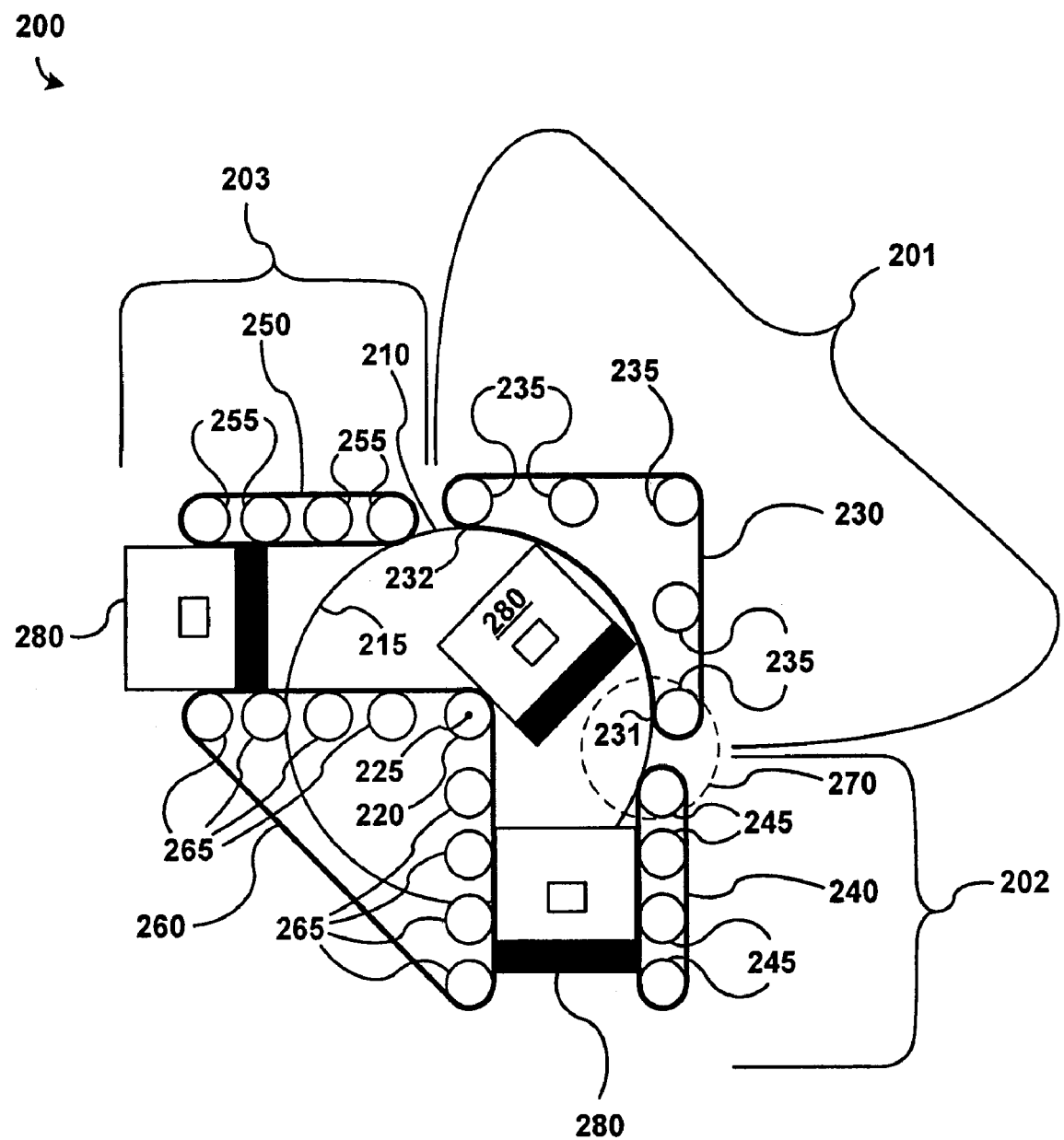
FIG. 2A illustrates a top view of a transport cornering system, according to various embodiments of the invention.

FIG. 2A illustrates a top view of a transport cornering system 200, according to various embodiments of the invention. The transport cornering system 200 comprises a curved conveyance section 201, an entrance conveyance section 202, and an exit conveyance section 203. The curved conveyance section 201 comprises a turnstile wheel 210 that rotates about an axis of rotation 225, an exterior corner belt 230, a plurality of exterior corner belt guide wheels 235, and an interior corner belt 260. The region between the interior corner belt 260 and the exterior corner belt 230, from a first exterior curve point 231 to a second exterior curve point 232, includes a curved conveyance path for an article 280. The exterior corner belt 230 is disposed along an exterior edge of the curved conveyance path. The interior corner belt 260 is disposed along an interior edge of the curved conveyance path. A plurality of the articles 280 may enter the transport cornering system 200 for transport through the curved conveyance path, passing over or under a portion of the turnstile wheel 210, and rotating about the axis of rotation 225.

The turnstile wheel 210 comprises an exterior turnstile wheel surface 215 and an interior turnstile wheel surface 220. The exterior turnstile wheel surface 215 is configured to guide the exterior corner belt 230 and the interior turnstile wheel surface 220 is configured to guide the interior corner belt 260. The exterior turnstile wheel surface 215 and the interior turnstile wheel surface 220 are configured to rotate about a common vertically-oriented axis of rotation 225. In various embodiments, the exterior turnstile wheel surface 215 is disposed completely below the articles 280 to be conveyed through the curved conveyance section 201. In some embodiments, the interior turnstile wheel surface 220 and the exterior turnstile wheel surface 215 are both integral parts of the same physical turnstile wheel 210. In other embodiments, the interior turnstile wheel surface 220 is an integral part of a first turnstile wheel component, and the exterior turnstile wheel surface 215 is an integral part of a second turnstile wheel component. The first turnstile wheel component and the second turnstile wheel component may be coupled together to collectively form the turnstile wheel 210 assembly, for example by a common spindle.

In still other embodiments, the first turnstile wheel component and the second turnstile wheel component are physically decoupled from one another. For example, the first turnstile wheel component comprising the interior turnstile wheel surface 220 may not physically touch the second turnstile wheel component comprising the exterior turnstile wheel surface 215, and the first turnstile wheel component may rotate around a separate spindle from the second turnstile wheel component. In these embodiments, rotation of the exterior turnstile wheel surface 215 and rotation of the interior turnstile wheel surface 220 are controlled such that each rotates at a same angular velocity. In some embodiments, the first turnstile wheel component and the second turnstile wheel component rotate under the power of a common power source. In other embodiments, the first turnstile wheel component rotates under the power of a first power source, and the second turnstile wheel component rotates under the power of a second power source, the first power source and the second power source being physically decoupled from one another.

In some embodiments, the exterior turnstile wheel surface 215 is configured to maintain, a continuous curve in the portion of the exterior corner belt 230 that comes in contact with the exterior turnstile wheel surface 215. Likewise, the interior turnstile wheel surface 220 may be configured to maintain a continuous curve in the portion of the interior corner belt 260 that comes in contact with the interior turnstile wheel surface 220. Thus, the exterior corner belt and the interior corner belt are optionally continuously curved through the curved conveyance section. This is in contrast to systems (such as those disclosed in U.S. application Ser. No. 11/406,569 entitled "Transport System Including Vertical Rollers," filed Apr. 18, 2006, which is incorporated herein by reference) in which a conveyance path to change the direction of conveyance of an article is formed by the placement of belts on either side of the conveyance path and guided by a series of guide wheels, the guide wheels being offset from one another such that the direction of travel of the belts changes between one guide wheel and another. In such a system, the belts and thus the conveyance path is piecewise linear, being essentially straight from one guide wheel to the next, and changing direction only at each of the several guide wheels.

In some embodiments, the exterior corner belt 230 comes in contact with the exterior turnstile wheel surface at the first exterior curve point 231, and ceases to make contact with the exterior turnstile wheel surface at the second exterior curve point 232. The interior turnstile wheel surface 220 and the exterior turnstile wheel surface 215 are configured to move the interior corner belt 260 and the exterior corner belt 230 at a same angular velocity about the axis of rotation 225. Therefore, the linear velocity of the exterior corner belt 230 is greater than the linear velocity of the interior corner belt 260.

In various embodiments, one or more exterior corner belt guide wheels 235 and the exterior turnstile wheel surface 215 make contact with the exterior corner belt 230 on opposing sides of the exterior corner belt 230. In some embodiments, some instances of the exterior corner belt guides wheels 235 make contact with the exterior corner belt 230 at a point directly opposite a point where the exterior turnstile wheel surface 215 makes contact with the exterior corner belt 230, such as at the first exterior curve point 231 and the second exterior curve point 232. In some embodiments, a point where an instance of the exterior corner belt guides wheels 235 makes contact with the exterior corner belt 230 and a point where the exterior turnstile wheel surface 215 makes contact with the exterior corner belt 230 are displaced from each other along the length of the belt.

In various embodiments, the entrance conveyance section 202 receives the article 280 from a source disposed outside of the transport cornering system 200 and delivers the received article 280 to the curved conveyance section 201. The entrance conveyance section 202 comprises an exterior entrance belt 240, a plurality of exterior entrance belt guide wheels 245, the interior corner belt 260, and a subset of the interior corner belt guide wheels 265. The plurality of exterior entrance belt guide wheels 245 are configured to guide the exterior entrance belt 240. The plurality of interior corner belt guide wheels 265 are configured to guide the interior corner belt 260. The region between the interior corner belt 260 and the exterior entrance belt 240 includes an entrance conveyance path for the article 280. The exterior entrance belt 240 is configured to move at the same linear velocity as the interior corner belt 260, and thus to guide the article 280 into the transport cornering system 200. Because the exterior corner belt 230 and the interior corner belt 260 are configured to move at the same angular velocity and different linear velocities, the exterior entrance belt 240 and the exterior corner belt 230 move at different linear velocities. The faster linear velocity of the exterior corner belt 230 relative to the interior corner belt 260, combined with the curvature of the exterior corner belt 230 around the axis of rotation 225, causes the article 280 entering the curved conveyance section 201 to begin to turn in the direction of the exit conveyance section 203. A transition region 270 between the entrance conveyance section 202 and the curved conveyance section 201 provides the necessary guidance and support for the articles 280 as they leave the entrance conveyance section 202, enter the curved conveyance section 201, and change their direction of travel. The transition region 270 is magnified in FIGS. 2B and 2C. In some embodiments, a transition region (not shown) similar to the transition region 270 may be disposed on the interior side of the curved conveyance section 201. In these embodiments, the instance of the transition region 270 on the exterior side of the curved conveyance section 201 is optional. In various embodiments, a transition region (not shown) similar to the transition region 270 may be disposed between the curved conveyance section 201 and the exit conveyance section 203 on either the interior side or the exterior side of the curved conveyance section 201.

In various embodiments, the exit conveyance section 203 receives the articles 280 from the curved conveyance section 201 and delivers them, to a location disposed outside the transport cornering system 200. The exit conveyance section 203 comprises an exterior exit belt 250, a plurality of exterior exit belt guide wheels 255, the interior corner belt 260, and a subset of the interior corner belt guide wheels 265.

The plurality of exterior exit belt guide wheels 255 are configured to guide the exterior exit belt 250. The plurality of interior corner belt guide wheels 265 are configured to guide the interior corner belt 260. The region between the interior corner belt 260 and the exterior exit belt 250 includes an exit conveyance path of the article 280. The exterior exit belt 250 is configured to move at the same linear velocity as the interior corner belt 260, and thus to guide the article 280 out of the transport cornering system 200.

Figure 2B:
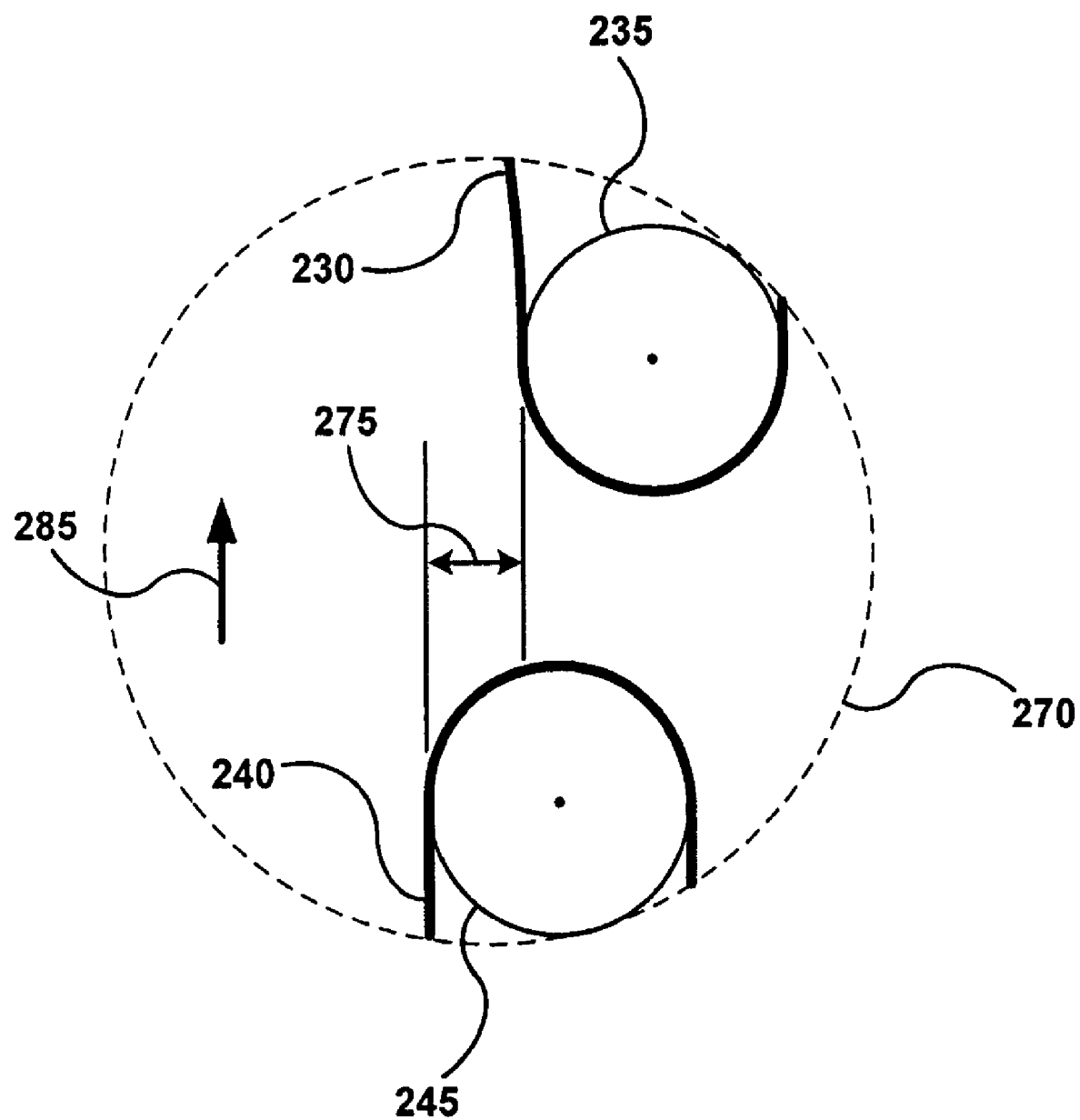
FIG. 2B illustrates a portion of FIG. 2A, enlarged for magnification purposes to illustrate a horizontal offset, according to various embodiments of the invention.

FIG. 2B illustrates a portion of the transport cornering system 200, enlarged for magnification purposes to illustrate a horizontal offset, according to various embodiments of the invention. A portion of the turnstile wheel 210 shown in the transition region 270 in FIG. 2A is not shown in FIG. 2B for clarity. The transition region 270 comprises part of the exterior corner belt 230, part of the exterior entrance belt 240, an exterior entrance belt guide wheel 245, and an exterior corner belt guide wheel 235. The transition region 270 is typically configured to provide a horizontal offset distance 275 between a position of the exterior entrance belt 240 and a position of the exterior corner belt 230. This horizontal offset is perpendicular to a direction 285 of travel of the article 280 through the conveyance path. In some embodiments, the horizontal offset distance 275 is configured to enable the article 280 within the conveyance path to disengage from the exterior entrance belt 240 before the article 280 is engaged by the exterior corner belt 230. Thus, one side of the article 280 is typically not engaged by two different belts, traveling at different speeds, at the same time. When the transition region 270 is disposed between transport sections configured to transport a FOUP in different directions, then the horizontal offset is configured to allow the FOUP to begin a change in direction within transition region 270.

Figure 2C:
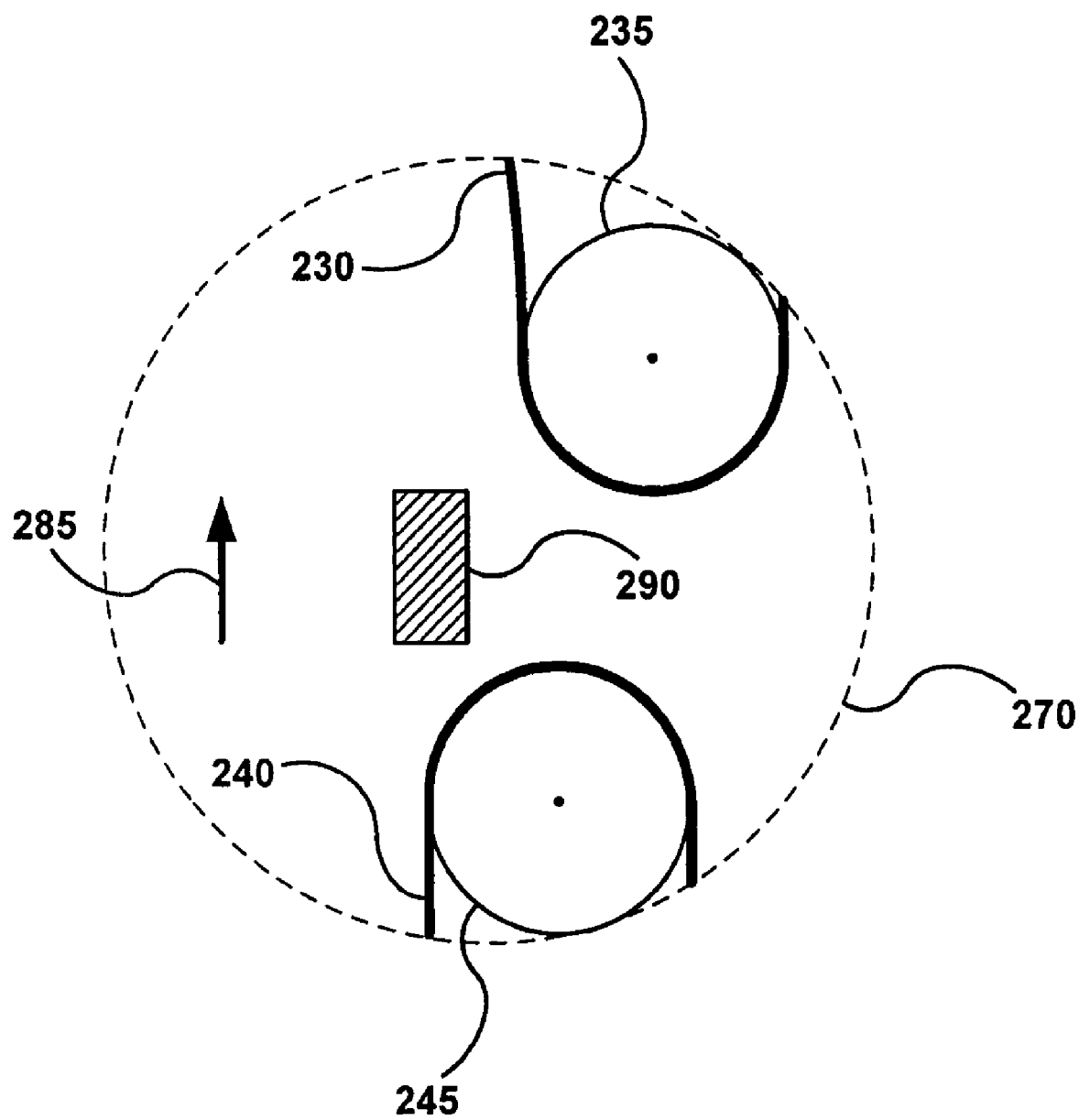
FIG. 2C illustrates a portion of FIG. 2A, enlarged for magnification purposes to illustrate the placement of an optional support structure within the transition region, according to various embodiments of the invention.

FIG. 2C illustrates a portion of the transport cornering system 200, enlarged for magnification purposes to illustrate the placement of an optional support structure 290 within the transition region 270, according to various embodiments of the invention. A portion of the turnstile wheel 210 shown in the transition region 270 in FIG. 2A is not shown in FIG. 2C for clarity. In various embodiments, one or more support structures 290 may be configured to provide guidance and/or support to the article 280 as the article 280 transitions from being guided by the exterior entrance belt 240 to being guided by the exterior corner belt 230. In some embodiments, the support structure 290 may be configured to approximately match the horizontal or rotational movement of the article 280. For example, the one or more support structures 290 may be configured to move vertically or horizontally away from the article 280, approximately perpendicular to the direction 285 of travel of the article 280 through the conveyance path, as the article 280 makes contact with the exterior corner belt 230 and begins rotating about the axis of rotation 225.

In various embodiments, the one or more support structures 290 include one or more transition wheels. The transition wheels may be configured to rotate at a speed matched to the speed of the article 280. This may reduce potential friction and stresses due to velocity mismatches. In some embodiments, the transition wheel is magnetically coupled to a drive mechanism that causes the transition wheel to rotate at a specific velocity. For example, the drive mechanism causing the exterior entrance belt guide wheels 245 to rotate may also be magnetically coupled to a drive mechanism causing the transition wheels to rotate. In some embodiments, the transition wheel may be attached to a lever and/or a spring that enables the transition wheel to move vertically or horizontally away from the article 280, approximately perpendicular to the direction 285 of travel of the article 280 through the conveyance path, as the article 280 makes contact with the exterior corner belt 230 or begins rotating about the axis of rotation 225.

In various embodiments, the one or more support structures 290 include one or more air bearings provided by one or more air bearing generators. Air bearing generators, as described elsewhere herein, may be configured to provide the article 280 with non-contacting physical support using an air cushion when the article 280 travels between the exterior entrance belt 240 and the exterior corner belt 230.

Figure 3:
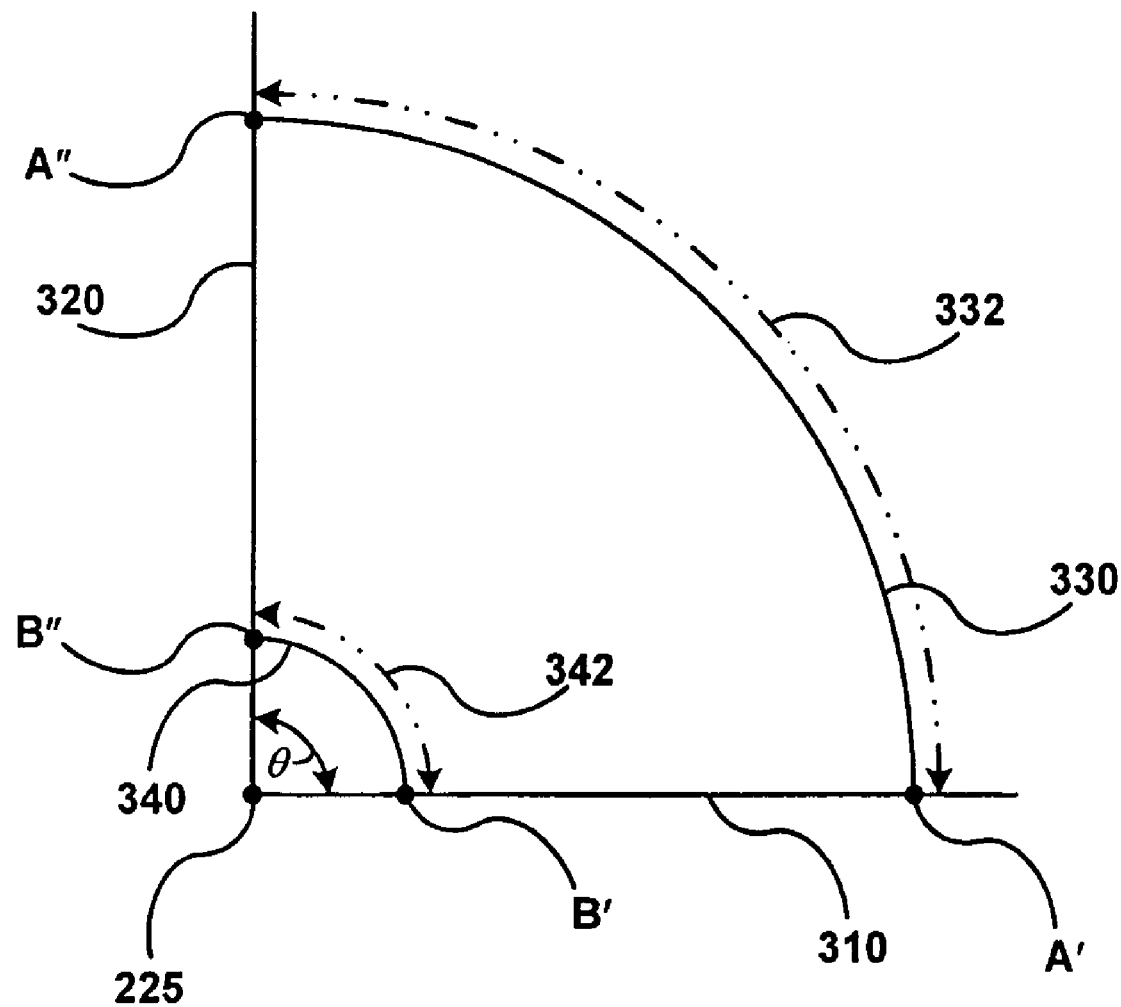
FIG. 3 illustrates the relationships between linear velocity and angular velocity of the external corner belt and the interior corner belt, and the axis of rotation of the turnstile wheel, according to some embodiments of the invention.

FIG. 3 illustrates the relationships between linear velocity and angular velocity of the external corner belt 230 and the interior corner belt 260, and the axis of rotation 225 of the turnstile wheel 210, according to some embodiments of the invention. FIG. 3 illustrates the curved conveyance section 201 comprising a curved conveyance section entrance 310 and a curved conveyance section exit 320. A curved conveyance path is bounded by an exterior curve 330 and an interior curve 340. The exterior curve 330 represents the segment of the exterior corner belt 230 that comes into contact with the exterior turnstile wheel surface 215. The interior curve 340 represents the segment of the interior corner belt 260 that comes into contact with the interior turnstile wheel surface 220. An angle of rotation θ is specified between the curved conveyance section entrance 310 and the curved conveyance section exit 320 around the axis of rotation 225. A first endpoint A' of the exterior curve 330 is positioned at the curved conveyance section entrance 310, and corresponds to the first exterior curve point 231 shown in FIG. 2A. A second endpoint A" of the exterior curve 330 is positioned at the curved conveyance section exit 320, and corresponds to the second exterior curve point 232 shown in FIG. 2A. A first endpoint B' of the interior curve 340 is positioned at the curved conveyance section entrance 310, and a second endpoint B" of the interior curve 340 is positioned at the curved conveyance section exit 320.

In various embodiments, the time required for the interior side of the article 280 to traverse the curved conveyance section 201 along the interior curve 340 and the time required for the exterior side of the article 280 to traverse the curved conveyance section 201 along the exterior curve 330 are approximately equal; therefore the angular velocity of the exterior corner belt 230 along the exterior curve 330 and the angular velocity of the interior corner belt 260 along the interior curve 340 are approximately equal. Because an exterior curve length 332 is greater than an interior curve length 342, the linear velocity of the exterior corner belt 230 along the exterior curve 330 is greater than the linear velocity of the interior corner belt 260 along the interior curve 340.

More specifically, a linear velocity is determined by the following formula:

$$v=d/t$$

where υ is the linear velocity, d is a distance traveled, and t is a time required for an object (not shown) to travel the distance d. An angular velocity is determined by the following formula:

$$\omega=\theta/t$$

where ω is the angular velocity, θ is an angle between the two endpoints of the distance d traveled around a curve, and t is the time required for the object to travel the distance d.

With reference to FIG. 3, a linear velocity of the exterior corner belt 230 configured to travel along the exterior curve 330 from endpoint A' to endpoint A" is defined as the following:

$$v_A = d_A/t_A$$

where $v_A$ is the linear velocity of the exterior corner belt 230, $d_A$ is the exterior curve length 332 traveled by the exterior corner belt 230 from endpoint A' to endpoint A", and $t_A$ is a time required for the exterior corner belt 230 to travel the distance $d_A$. An angular velocity of the exterior corner belt 230 configured to travel along the exterior curve 330 from endpoint A' to endpoint A" is defined as the following:

$$\omega_A = \theta/t_A$$

where $\omega_A$ is the angular velocity of the exterior corner belt 230 configured to travel along the exterior curve 330 from endpoint A' to endpoint A", θ is an angle between the endpoint A' and the endpoint A", and $t_A$ is the time required for the exterior corner belt 230 to travel the distance $d_A$.

Likewise, a linear velocity of the interior corner belt 260 configured to travel along the interior curve 340 from endpoint B' to endpoint B" is defined as the following:

$$v_B = d_B/t_B$$

where $v_B$ is the linear velocity of the interior corner belt 260, $d_B$ is the interior curve length 342 traveled by the interior corner belt 260 from endpoint B' to endpoint B", and $t_B$ is a time required for the interior corner belt 260 to travel the distance $d_B$. An angular velocity of the interior corner belt 260 configured to travel along the interior curve 340 from endpoint B' to endpoint B" is defined as the following:

$$\omega_B = \theta/t_B$$

where $\omega_B$ is the angular velocity of the interior corner belt 260 configured to travel along the interior curve 340 from endpoint B' to endpoint B", θ is an angle between the endpoint B' and the endpoint B", and $t_B$ is the time required for the interior corner belt 260 to travel the distance $d_B$.

To enable a front surface of the article 280, which is initially parallel to the curved conveyance section entrance 310, to be parallel with the curved conveyance section exit 320 after being transported through the curved conveyance section 201, various embodiments of the present invention are configured such that the time $t_A$ required for a point on the front of the article 280 closest to the exterior curve 330 to travel from endpoint A' to endpoint A" is approximately equal to the time $t_B$ required for a point on the front of the article 280 closest to the interior curve 340 to travel from endpoint B' to endpoint B". Therefore, the angular velocity $\omega_A$ of the exterior curve 330 is approximately equal to the angular velocity $\omega_B$ of the interior curve 340. In various embodiments of the present invention, $d_A$ is greater than $d_B$, and therefore, $v_A$ is greater than $v_B$ if $t_A$ and $t_B$ are approximately equal.

FIGS. 4A, 4B, 4C, and 4D illustrate cross-sectional views of alternative embodiments of the exterior corner belt 230, the turnstile wheel 210, and a plurality of the exterior corner belt guide wheels 235, according to various embodiments of the invention. In these embodiments, the exterior corner belt 230 is supported on one side by the turnstile wheel 210 and supported on the other side by one or more guide wheels 235. At various points along the length of the exterior corner belt 230, the exterior corner belt 230 may be supported and/or guided by either the turnstile wheel 210 or the exterior corner belt guide wheel 235, or both the turnstile wheel 210 and the exterior corner belt guide wheel 235. Many variations from the illustrated embodiments of the exterior corner belt 230, the turnstile wheel 210, and the exterior corner belt guide wheels 235 are within the scope of this disclosure.

FIG. 4A illustrates various embodiments of the exterior corner belt guide wheel 235 and the exterior corner belt 230. In these embodiments, the exterior corner belt guide wheels 235 include a cylindrical surface 410 and a notch or groove, such as a wheel V-groove 420, configured to receive a protruding part 440 of the exterior corner belt 230. The exterior corner belt guide wheels 235 are configured to rotate around a vertical rotation axis 430. The wheel V-groove 420 includes a conical support surface 415 configured to support the exterior corner belt 230. The conical support surface 415 carries the weight of the exterior corner belt 230 and, through a plurality of support protrusions 460 disposed on an exterior surface of the exterior corner belt 230, the weight of an article 280 (not shown) that rests on a support protrusion surface 465. The support protrusion surface 465 optionally includes a low friction coating (not shown). In some embodiments, the support protrusion surface 465 is disposed a distance 480 below an upper edge 485 of the exterior corner belt 230. As such, part of the article 280 transported may be below part of the exterior corner belt 230. In various embodiments, the distance 480 is equal to or great than zero, 10, 20, or 50 mm. The exterior corner belt guide wheels 235 may support the exterior corner belt 230 on two sides, as illustrated in FIG. 4A, or on a single side. In various embodiments, the exterior corner belt guide wheels 235 may be configured to be taller than, equal in height to, or shorter than the exterior corner belt 230.

In typical embodiments, the exterior corner belt 230 further comprises a belt V-groove 470. The belt V-groove 470 is configured to receive and be supported by an external turnstile wheel support protrusion 490 disposed along the external turnstile wheel surface 215. The external turnstile wheel support protrusion 490 includes an external turnstile conical support surface 495 configured to support the exterior corner belt 230. The external turnstile conical support surface 495 may be configured to be horizontal rather than conical.

FIG. 4B illustrates a cross-sectional view of alternative embodiments of the exterior corner belt guide wheel 235 and the exterior corner belt 230. These embodiments include an optional capture lip 450. The capture lip 450 is optionally included in other embodiments illustrated herein. The capture lip 450 is attached to the exterior corner belt 230 and is configured to restrict the vertical movement of the article 280. The capture lip 450 is optionally integral with or connected to the support protrusions 460. In alternative embodiments, the capture lip 450 is attached to a separate, optionally stationary, support structure (not shown).

Figure 4D:
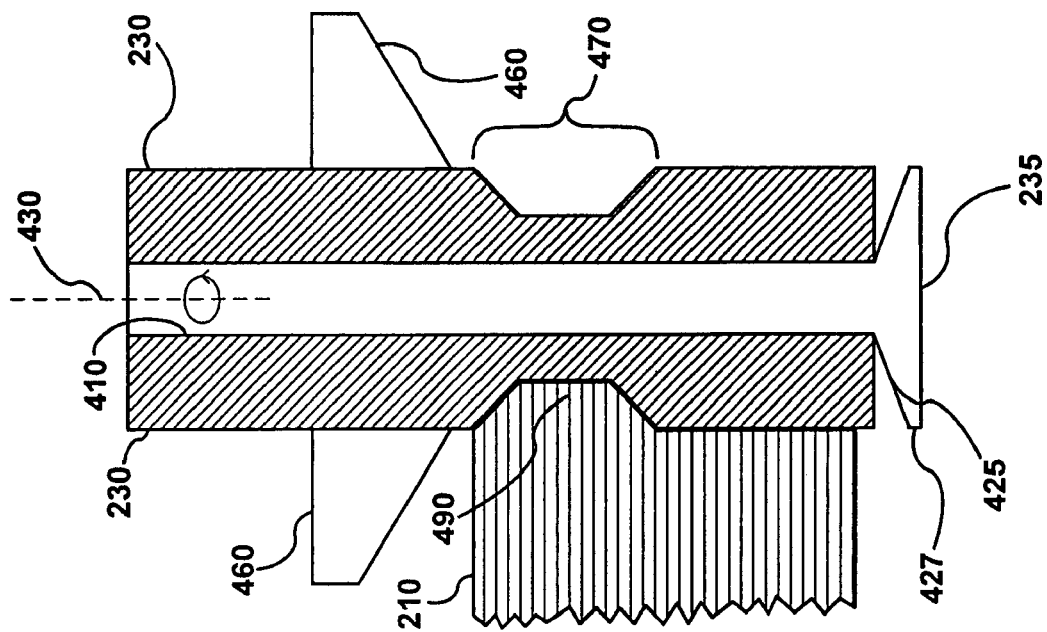
Figure 4C:
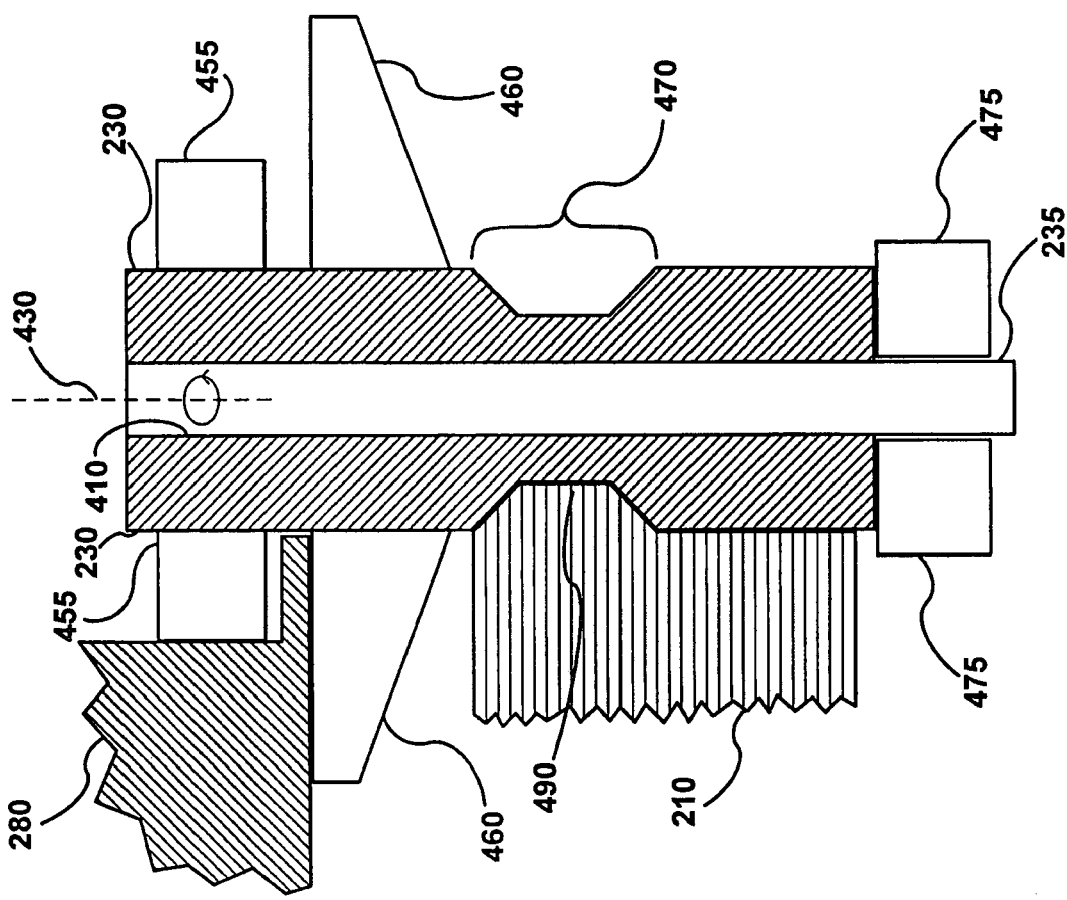

FIG. 4C illustrates a cross-sectional view of alternative embodiments of the exterior corner belt guide wheel 235 and the exterior corner belt 230. These embodiments include an optional support 475. The support 475 is configured to support the exterior corner belt 230 when in contact with the exterior corner belt guide wheel 235 and/or the turnstile wheel 210. In some embodiments, the support 475 includes a stationary low friction surface on which the exterior corner belt 230 is configured to slide. In some embodiments, support 475 includes rolling elements such as ball bearings, or horizontally disposed rollers (not shown). These horizontally disposed rollers are optionally smaller and more closely spaced than the exterior corner belt guide wheels 235. The support 475 is configured to carry the weight of the exterior corner belt 230.

In some embodiments, the exterior corner belt 230 is configured to include an optional capture element 455. The capture element 455 is optionally connected to or integral with the support protrusion 460. The capture element 455 is configured to apply pressure against a side of the article 280 in order to hold the article 280 securely between the exterior corner belt 230 and the interior corner belt 260 (shown in FIG. 2A). The capture element 455 is typically a compliant material such as urethane.

FIG. 4D illustrates a cross-sectional view of alternative embodiments of the exterior corner belt guide wheel 235 and the exterior corner belt 230. In these embodiments, the exterior corner belt guide wheels 235 are configured to include a support surface 425. The support surface 425 is configured to support the exterior corner belt 230 and rotate around the vertical rotation axis 430 simultaneously and in synchronization with the cylindrical surface 410. The support surface 425 is optionally configured to be perpendicular to the vertical rotation axis 430 or taper downward (as shown) towards an outside edge 427 of the exterior corner belt guide wheel 235. The outside edge 427 may optionally be configured to be a distance from the vertical rotation axis 430 less than, equal to, or greater than the width of any portion of the exterior corner belt 230. The support surface 425 optionally comprises a low friction material such as Teflon™. The support surface 425 is configured to carry the weight of the exterior corner belt 230.

In various embodiments, the interior turnstile wheel surface 220 and the interior corner belt 260 may have profiles similar to those illustrated herein for the exterior turnstile wheel surface 215 and the exterior corner belt 230. In various embodiments, the exterior turnstile wheel surface 215 may comprise an external turnstile wheel V-groove (not shown) similar to wheel V-groove 420 in addition to, or instead of, the external turnstile wheel support protrusion 490. In these embodiments, the external corner belt 230 may further comprise a protruding part (not shown) similar to protruding part 440 (FIG. 4A) configured to mate with the external turnstile wheel V-groove. This further protruding part (not shown) may be disposed on the external corner belt 230 in addition to, or instead, of the belt V-groove 470.

Figure 5A:
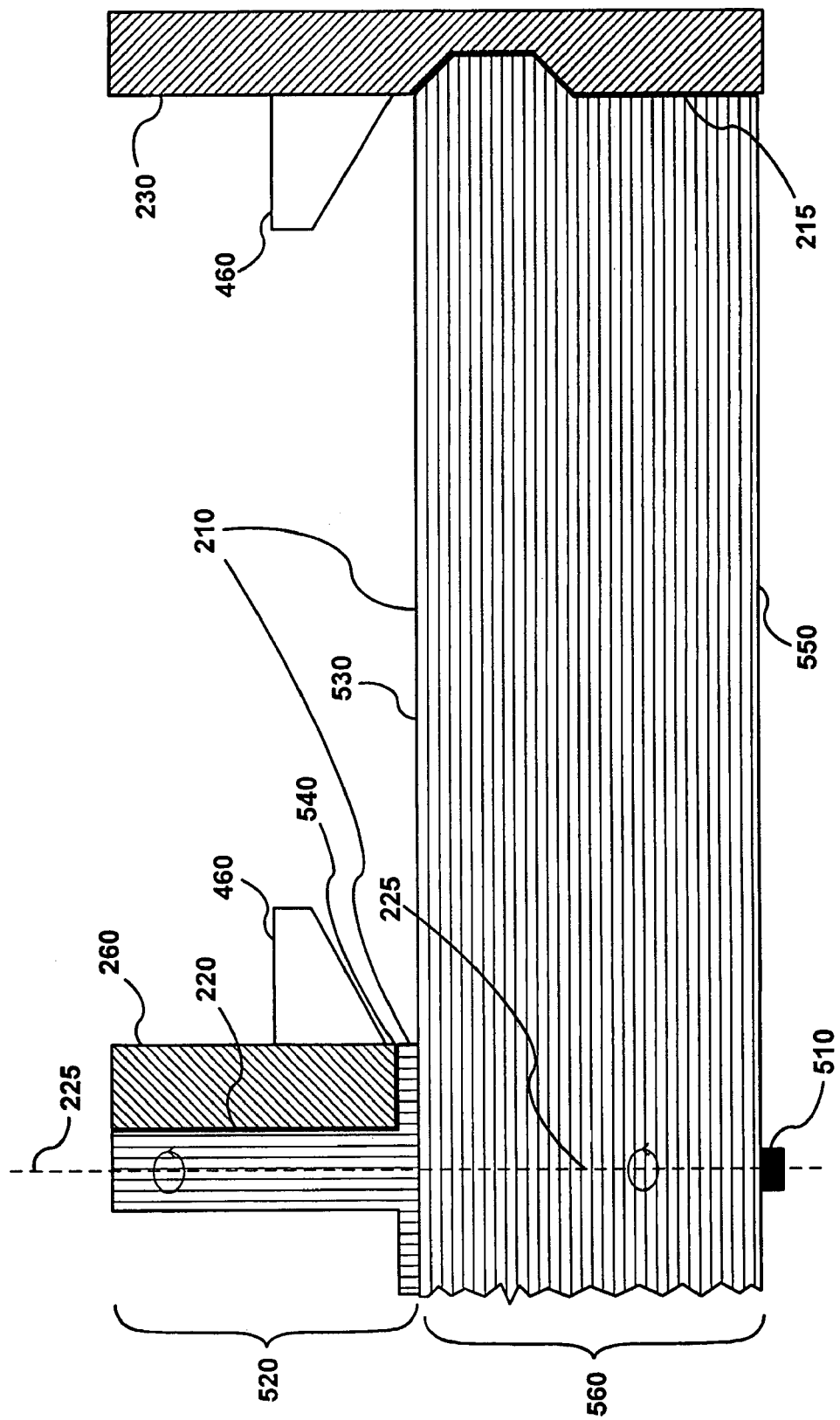
FIGS. 5A and 5B illustrate cross-sectional views of alternative embodiments of a turnstile wheel, an interior corner belt, and an exterior corner belt, according to various embodiments of the invention.
Figure 5B:
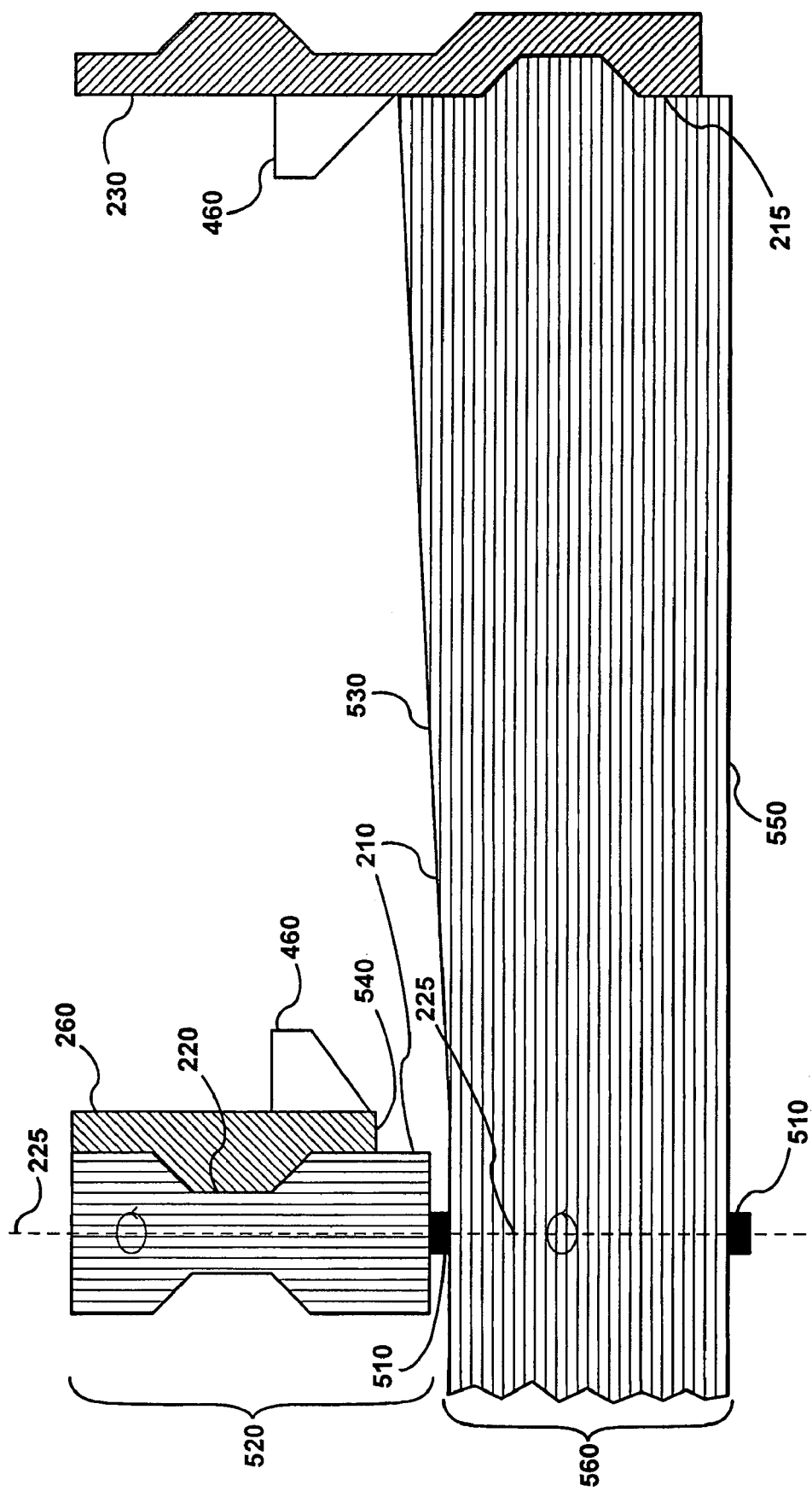

FIGS. 5A and 5B illustrate cross-sectional views of alternative embodiments of the turnstile wheel 210, the interior corner belt 260, and the exterior corner belt 230. The turnstile wheel 210 comprises a wide turnstile wheel element 560 and a narrow turnstile wheel element 520, which both are both coupled with a common spindle 510 and configured to rotate about a common axis of rotation 225. In some embodiments as illustrated in FIG. 5A, the wide turnstile wheel element 560 and the narrow turnstile wheel element 520 are integral with one another, while in other embodiments as illustrated in FIG. 5B, the wide turnstile wheel element 560 and the narrow turnstile wheel element 520 are physically decoupled from one another. In some embodiments, the wide turnstile wheel element 560 may be coupled to the spindle 510 while the narrow turnstile wheel element 520 may be coupled a separate spindle (not shown) and configured to rotate about the common axis of rotation 225. In some embodiments, the wide turnstile wheel element 560 and the narrow turnstile wheel element 520 rotate under the power of a common power source or under the power of independent power sources.

The wide turnstile wheel element 560 comprises the external turnstile wheel surface 215, while the narrow turnstile wheel element 520 comprises the internal turnstile wheel surface 220. The exterior turnstile wheel surface 215 and the interior turnstile wheel surface 220 are configured to rotate about the same axis of rotation 225. In various embodiments, the interior turnstile wheel surface 220 and the exterior turnstile wheel surface 215 are configured to position the support protrusions 460 attached to the interior corner belt 260 and the support protrusions 460 attached to the exterior corner belt 230 at an approximately same height relative to one another.

In various embodiments, a turnstile wheel top surface 530 is configured to be approximately horizontal, and thus, perpendicular to the axis of rotation 225 from the interior corner belt 260 to the external turnstile wheel surface 215. In various embodiments, the turnstile wheel top surface 530 is sloped upward or downward from the interior corner belt 260 to the external turnstile wheel surface 215. The turnstile wheel top surface 530 may be irregular in height. Typically, the maximum height of the turnstile wheel top surface 530 between the interior corner belt 260 and the external corner belt 230 is configured to be below a bottom surface 540 of the interior corner belt 260.

In various embodiments, a turnstile wheel bottom surface 550 is configured to be approximately horizontal, and thus, perpendicular to the axis of rotation 225 from the spindle 510 to the external turnstile wheel surface 215. The turnstile wheel bottom surface 550 may be may be irregular in height and/or sloped upward or downward from the spindle 510 to the external turnstile wheel surface 215.

In various embodiments, the exterior corner belt 230, the interior corner belt 260, the exterior entrance belt 240, the exterior exit belt 250, the turnstile wheel 210, the exterior corner belt guide wheels 235, the exterior entrance belt guide wheels 245, the interior corner belt guide wheels 265, and the exterior exit belt guide wheels 255 may comprise any characteristics of the vertical belts disclosed in patent application Ser. No. 11/406,569 entitled "Transport System Including Vertical Rollers," filed Apr. 18, 2006, which is incorporated herein by reference.

Figure 6:
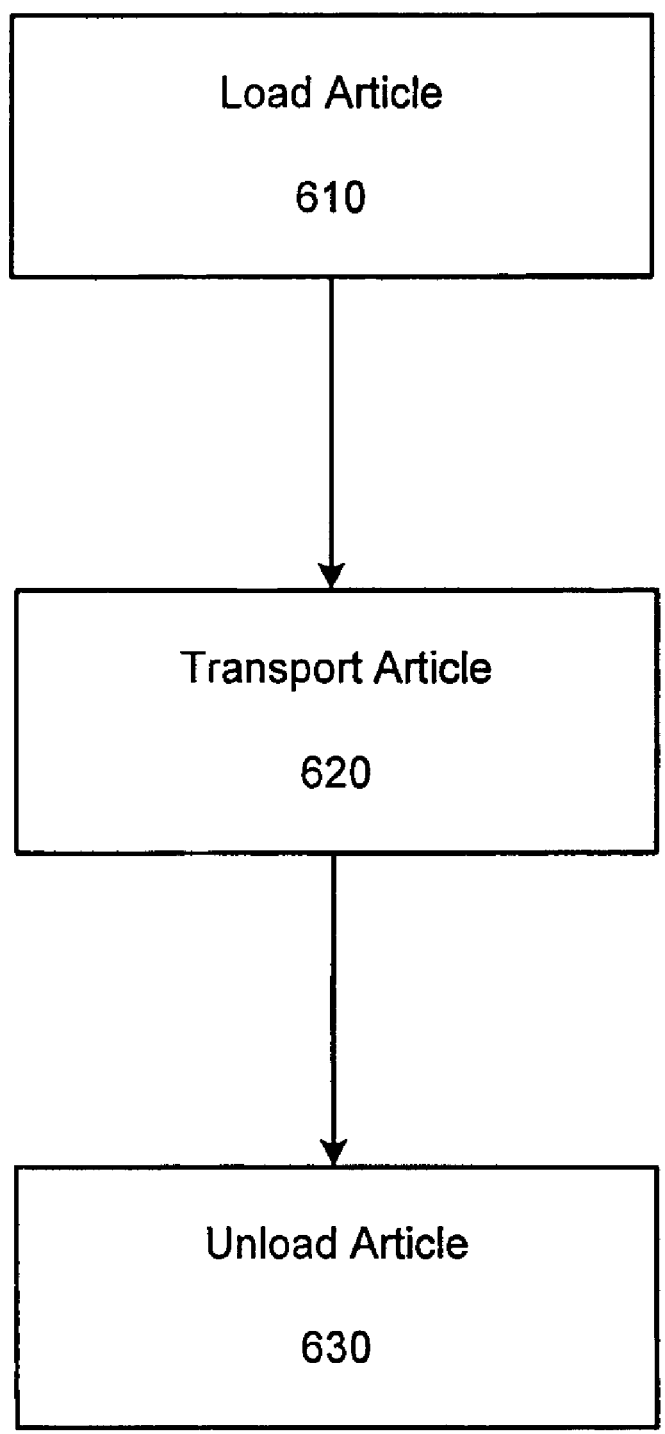
FIG. 6 illustrates methods of conveying articles through a corner, according to various embodiments of the invention.

FIG. 6 illustrates methods of conveying an article through a corner, according to various embodiments of the invention. In these methods, the article is loaded onto a transport system comprising a corner such as those described elsewhere herein, transported through the curved conveyance section, and unloaded. In some embodiments, these methods enable the article to traverse the corner without significantly slowing or without momentarily stopping, thereby enabling the article to be more closely spaced with other articles and enabling more articles to pass through the corner in a given unit of time than in the prior art.

In step 610, an article to be conveyed is placed on a conveyance section of a transport cornering system. The article is optionally loaded onto a section of the transport cornering system by another transport system configured to be adjacent to both an exterior entrance belt and an interior corner belt. The article is optionally placed at a section of an embodiment of the transport cornering system specifically configured for loading and unloading articles, such as a section comprising a lift and/or a kinematic interface. In various embodiments, the transport section on which the article is placed comprises the exterior entrance belt, the at least one exterior entrance belt guide wheel, the interior corner belt, and the at least one interior corner belt guide wheel.

In step 620, the article loaded in step 610 is transported along a conveyance path through the curved conveyance section. In various embodiments, the curved conveyance section comprises the turnstile wheel, the interior corner belt, and the exterior corner belt. The turnstile wheel comprises an external turnstile wheel surface and an internal turnstile wheel surface. The exterior turnstile wheel surface and the interior turnstile wheel surface are configured to rotate about the same axis of rotation. The exterior turnstile wheel surface and the interior turnstile wheel surface are further configured along with the exterior corner belt and the interior corner belt to convey the article through the curved conveyance section, the article rotating about the axis of rotation. The conveyance path is optionally traversed without slowing or without momentarily stopping the article.

In step 630, the article to be conveyed in step 620 is unloaded from the conveyance section of a transport cornering system. The article is optionally unloaded from a section of the transport cornering system by another transport system configured to be adjacent to both the exterior exit belt and the interior corner belt. The article is optionally unloaded from a section of an embodiment of the transport cornering system specifically configured for loading and unloading articles, such as a section comprising a lift and/or a kinematic interface. In various embodiments, the transport section from which the article is unloaded comprises the exterior exit belt, the at least one exterior exit belt guide wheel, the interior corner belt, and the at least one interior corner belt guide wheel.

Figure 7A:
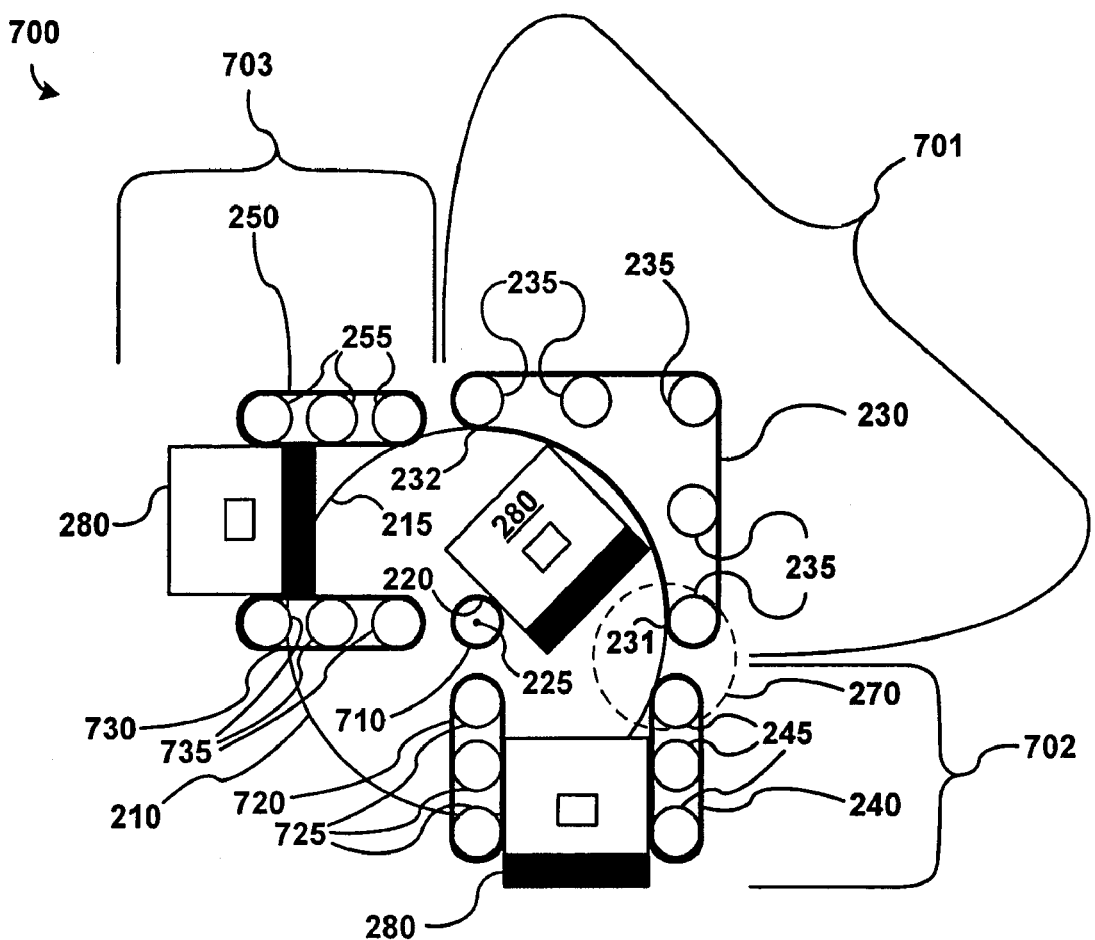
FIG. 7A illustrates a top view of a transport cornering system, according to various embodiments of the invention.

FIG. 7A illustrates a top view of a transport cornering system 700, according to various embodiments of the invention. The transport cornering system 700 is an alternative embodiment of the transport cornering system 200. The transport cornering system 700 comprises a curved conveyance section 701, an entrance conveyance section 702, and an exit conveyance section 703. The transport cornering system 700 differs from the transport cornering system 200 in that the interior corner belt 260 which guides the article 280 through the transport cornering system 200 is replaced by an interior entrance belt 720 configured to guide the article 280 through the entrance conveyance section 702, an interior turnstile wheel corner belt 710 configured to guide the article 280 through the curved conveyance section 701, and an interior exit belt 730 configured to guide the article 280 through the exit conveyance section 703.

The curved conveyance section 701 comprises the turnstile wheel 210 configured to rotate about the axis of rotation 225, the exterior corner belt 230, and the plurality of exterior corner belt guide wheels 235. The turnstile wheel 210 comprises the exterior turnstile wheel surface 215 and the interior turnstile wheel surface 220. The interior turnstile wheel surface 220 is optionally surrounded by an interior turnstile wheel corner belt 710. In embodiments comprising the interior turnstile wheel corner belt 710, the interior turnstile wheel corner belt 710 is configured to guide and/or support the article 280 as the article 280 traverses the curved conveyance section 701. In various embodiments, the interior turnstile wheel corner belt 710 is configured with approximately the same profile and construction as the interior corner belt 260 described elsewhere herein.

Figure 7B:
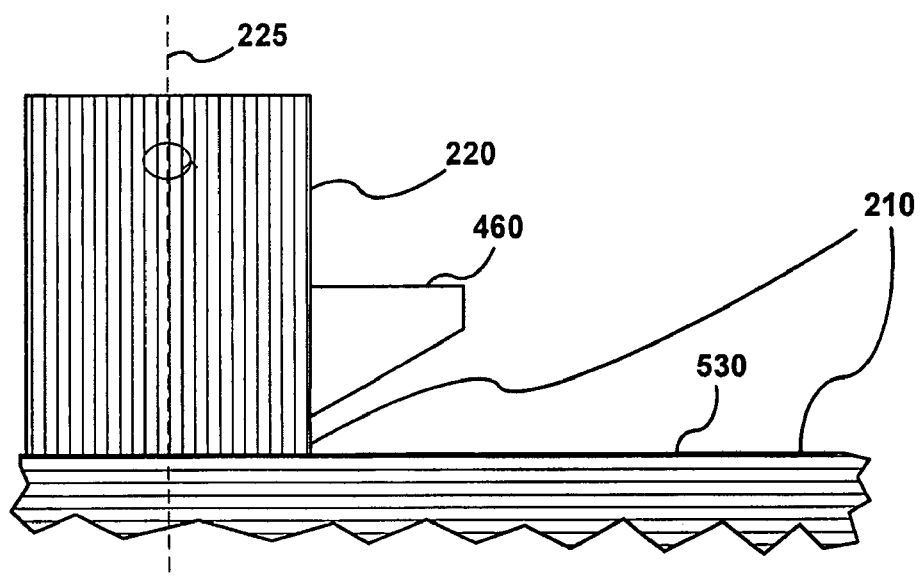
FIG. 7B illustrates a cross-sectional view of a turnstile wheel, according to various embodiments of the invention.

In embodiments not comprising the interior turnstile wheel corner belt 710, the interior turnstile wheel surface 220 is configured to guide and/or support the article 280 as the article 280 traverses the curved conveyance section 701. In these embodiments, a plurality of support protrusions 460 are disposed on the internal turnstile wheel surface 220 as illustrated in FIG. 7B, the support protrusions 460 being configured to support the article 280.

The region bounded by the interior turnstile wheel surface 220 or the interior turnstile wheel corner belt 710, the exterior corner belt 230, a first exterior curve point 231, and a second exterior curve point 232, includes a curved conveyance path for the article 280. The exterior corner belt 230 is disposed along an exterior edge of the curved conveyance path. The interior turnstile wheel surface 220 or the interior turnstile wheel corner belt 710 is disposed along an interior edge of the curved conveyance path. A plurality of the articles 280 may enter the transport cornering system 700 for transport through the curved conveyance path, passing over or under a portion of the turnstile wheel 210, and rotating about the axis of rotation 225.

In some embodiments, the exterior turnstile wheel surface 215 is configured to support and maintain a continuous curvature of the exterior corner belt 230. In these embodiments, the interior turnstile wheel surface 220 and the exterior turnstile wheel surface 215 are configured to move the exterior corner belt 230, the interior turnstile wheel surface 220, and/or the interior turnstile wheel corner belt 710 at a same angular velocity about the axis of rotation 225. Therefore, the linear velocity of the exterior corner belt 230 is greater than the linear velocity of the interior turnstile wheel corner belt 710 or the interior turnstile wheel surface 220.

In various embodiments, the entrance conveyance section 702 receives the article 280 from a source disposed outside of the transport cornering system 700 and delivers the received article 280 to the curved conveyance section 701. The entrance conveyance section 702 comprises an exterior entrance belt 240, a plurality of exterior entrance belt guide wheels 245, an interior entrance belt 720, and a plurality of interior entrance belt guide wheels 725. The plurality of exterior entrance belt guide wheels 245 are configured to guide the exterior entrance belt 24Q. The plurality of interior entrance belt guide wheels 725 are configured to guide the interior entrance belt 720. The region between the interior entrance belt 720 and the exterior entrance belt 240 includes an entrance conveyance path for the article 280. The exterior entrance belt 240 is configured to move at the same linear velocity as the interior entrance belt 720, and thus to guide the article 280 into the transport cornering system 700.

In various embodiments, the exterior entrance belt 240 is configured to move at approximately the same linear velocity as the exterior corner belt 230. In these embodiments, the interior entrance belt 720 and the interior turnstile wheel corner belt 710 and/or interior turnstile wheel surface 220 are configured to move at different linear velocities. In other embodiments, the interior entrance belt 720 is configured to move at approximately the same linear velocity as the interior turnstile wheel corner belt 710 and/or interior turnstile wheel surface 220. In these embodiments, the exterior entrance belt 240 and the exterior corner belt 230 are configured to move at different linear velocities. In other embodiments, the interior entrance belt 720 is configured to move at a different linear velocity and a different angular velocity than the interior turnstile wheel corner belt 710 and/or interior turnstile wheel surface 220.

In various embodiments, a distance between the interior entrance belt 720 and the exterior entrance belt 240, defining a width of the entrance conveyance path, is less than a distance between the exterior coiner belt 230 and the interior turnstile wheel corner belt 710 or interior turnstile wheel surface 220. This difference in distance is optionally the horizontal offset distance 275 illustrated elsewhere herein.

A transition region 270 between the entrance conveyance section 702 and the curved conveyance section 701 optionally provides guidance and support for articles 280 as the articles 280 leave the entrance conveyance section 702, enter the curved conveyance section 701, and change their direction of travel. The transition region 270 is magnified in FIGS. 2B and 2C. In various embodiments, a transition region similar to the transition region 270 is disposed between the curved conveyance section 701 and the exit conveyance section 703 on the exterior side of the curved conveyance section 701.

In some embodiments, one or more support structures (not shown) similar to the support structures 290 illustrated in FIG. 2C are disposed between the interior entrance belt 720 and the interior turnstile wheel surface 220, the support structures being configured to provide guidance and/or support to the article 280 as the article 280 transitions from being guided by the interior entrance belt 720 to being guided by the interior turnstile wheel surface 220 or the interior turnstile wheel corner belt 710. Likewise, in some embodiments, one or more support structures (not shown) similar to the support structures 290 illustrated in FIG. 2C are disposed between the interior exit belt 730 and the interior turnstile wheel surface 220, the support structures being configured to provide guidance and/or support to the article 280 as the article 280 transitions from being guided by the interior turnstile wheel surface 220 or the interior turnstile wheel corner belt 710, to being guided by the interior exit belt 730.

In various embodiments, the exit conveyance section 703 receives articles 280 from the curved conveyance section 701 and delivers the articles 280 to a location disposed outside of the transport cornering system 700. The exit conveyance section 703 comprises an exterior exit belt 250, a plurality of exterior exit belt guide wheels 255, an interior exit belt 730, and a plurality of interior exit belt guide wheels 735. The plurality of interior exit belt guide wheels 735 are configured to guide the interior exit belt 730. The region between the interior exit belt 730 and the exterior exit belt 250 includes an exit conveyance path of the article 280. The exterior exit belt 250 is configured to move at the same linear velocity as the interior exit belt 730, and thus to guide the article 280 out of the transport cornering system 700.

In various embodiments, the exterior exit belt 250 is configured to move at approximately the same linear velocity as the exterior corner belt 230. In these embodiments, the interior exit belt 730 and the interior turnstile wheel corner belt 710 and/or interior turnstile wheel surface 220 are configured to move at different linear velocities. In other embodiments, the interior exit belt 730 is configured to move at approximately the same linear velocity as the interior turnstile wheel corner belt 710 and/or interior turnstile wheel surface 220. In these embodiments, the exterior exit belt 250 and the exterior corner belt 230 are configured to move at different linear velocities.

In various embodiments, a distance between the interior exit belt 730 and the exterior exit belt 250, defining a width of the exit conveyance path, is less than a distance between the exterior corner belt 230 and the interior turnstile wheel corner belt 710 or interior turnstile wheel surface 220. This difference is optionally equal to the horizontal offset distance 275 illustrated elsewhere herein.

Figure 8:
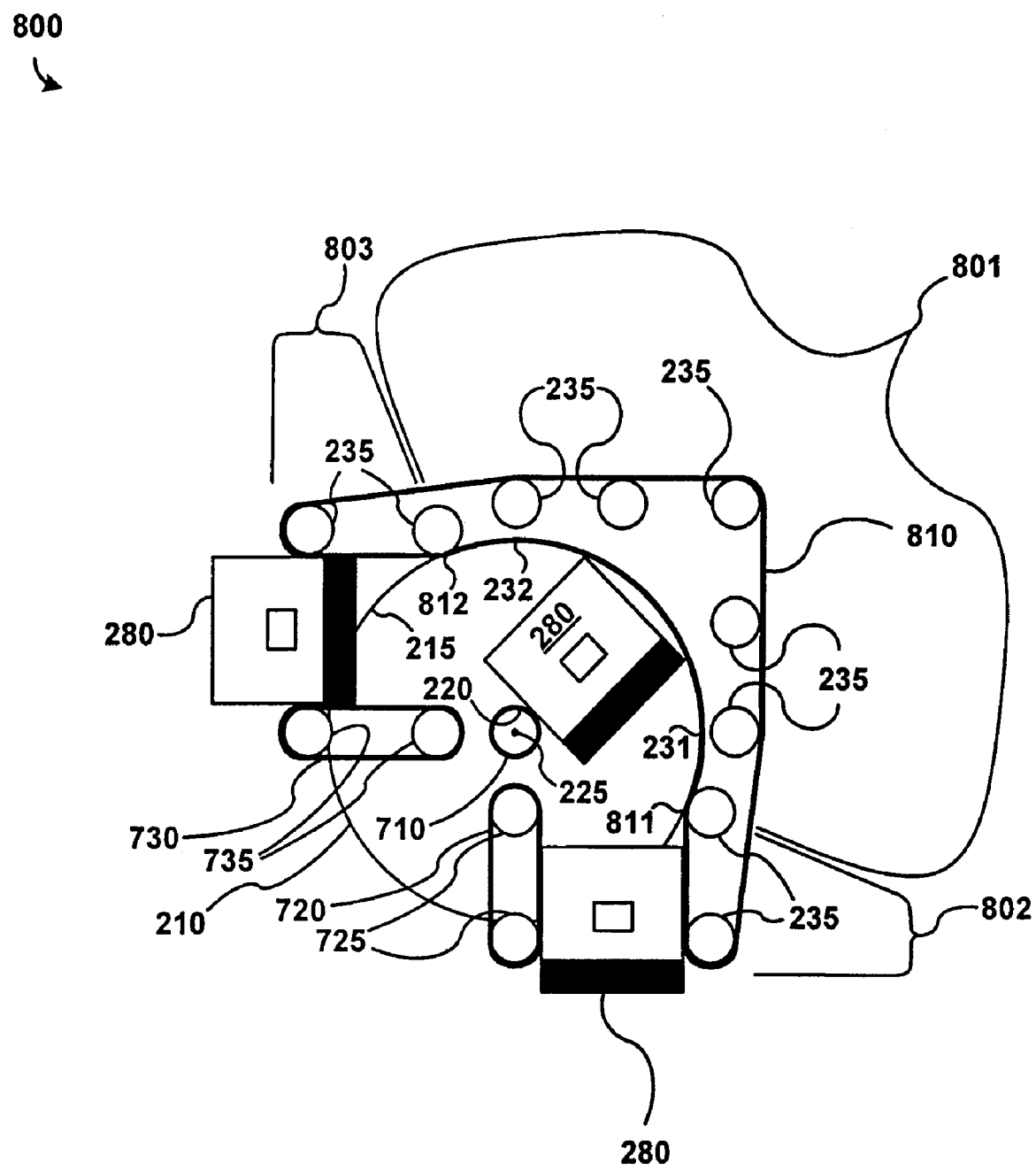
FIG. 8 illustrates a top view of a transport cornering system, according to various embodiments of the invention.

FIG. 8 illustrates a top view of a transport cornering system 800, according to various embodiments of the invention. The transport cornering system 800 is an alternative embodiment of the transport cornering system 200 and the transport cornering system 700. The transport cornering system 800 comprises a curved conveyance section 801, an entrance conveyance section 802, and an exit conveyance section 803. The curved conveyance section 801 comprises the turnstile wheel 210 that rotates about the axis of rotation 225, an exterior corner belt 810, and a subset of the plurality of exterior corner belt guide wheels 235.

The region bounded by the interior turnstile wheel surface 220 or the interior turnstile wheel corner belt 710, the exterior corner belt 810, a first exterior curve point 811, and a second exterior curve point 812, includes a curved conveyance path for the article 280. The exterior corner belt 810 is disposed along an exterior edge of the curved conveyance path. The interior turnstile wheel surface 220 or the interior turnstile wheel corner belt 710 is disposed along an interior edge of the curved conveyance path. A plurality of the articles 280 may enter the transport cornering system 800 for transport through the curved conveyance path, passing over or under a portion of the turnstile wheel 210, and rotating about the axis of rotation 225.

In some embodiments, the exterior turnstile wheel surface 215 is configured to support and maintain a continuous curvature of the exterior corner belt 810. In these embodiments, the interior turnstile wheel surface 220 and the exterior turnstile wheel surface 215 are configured to move the exterior corner belt 810, the interior turnstile wheel surface 220, and/or the interior turnstile wheel corner belt 710 at a same angular velocity about the axis of rotation 225. Therefore, the linear velocity of the exterior corner belt 810 is greater than the linear velocity of the interior turnstile wheel corner belt 710 and/or the interior turnstile wheel surface 220.

In various embodiments, the exterior corner belt 810 is configured with approximately the same profile and construction as the exterior corner belt 230 described elsewhere herein. In some embodiments, the exterior corner belt 810 comes in contact with the exterior turnstile wheel surface 215 at the first exterior curve point 811, and ceases to make contact with the exterior turnstile wheel surface 215 at the second exterior curve point 812. In contrast with the embodiments of the present invention illustrated in the transport cornering system 200 and the transport cornering system 700, embodiments illustrated by the transport cornering system 800 comprise the external corner belt 810 that continuously guides and supports the article 280 through the entrance conveyance section 802, the curved conveyance section 801, and the exit conveyance section 803. Therefore, a transition region 270 may not be needed along the exterior edge of the curved conveyance path in the transport cornering system 800. The transport cornering system 800 is configured to have a greater linear distance along the exterior turnstile wheel surface 215 between the first exterior curve point 811 and the second exterior curve point 812 than the linear distance along the exterior turnstile wheel surface 215 between the first exterior curve point 231 and the second exterior curve point 232 as illustrated with reference to the transport cornering system 200 and the transport cornering system 700. The plurality of exterior corner belt guide wheels 235 are configured to guide the exterior corner belt 810 as the exterior corner belt 810 moves through the progression of the entrance conveyance section 802, the curved conveyance section 801, and the exit conveyance section 803.

In various embodiments, one or more exterior corner belt guide wheels 235 and the exterior turnstile wheel surface 215 make contact with the exterior corner belt 810 on opposing sides of the exterior corner belt 810. In some embodiments, some instances of the exterior corner belt guides wheels 235 make contact with the exterior corner belt 810 at a point directly opposite a point where the exterior turnstile wheel surface 215 makes contact with the exterior corner belt 810, such as at the first exterior curve point 811 and the second exterior curve point 812. In some embodiments, a point where an instance of the exterior corner belt guides wheels 235 makes contact with the exterior corner belt 281 and a point where the exterior turnstile wheel surface 215 makes contact with the exterior corner belt 810 are displaced from each other along the length of the belt.

In various embodiments, the entrance conveyance section 802 receives the article 280 from a source disposed outside of the transport cornering system 800 and delivers the received article 280 to the curved conveyance section 801. The entrance conveyance section 802 comprises the exterior corner belt 810, a subset of the plurality of exterior corner belt guide wheels 235, an interior entrance belt 720, and a plurality of interior entrance belt guide wheels 725. The region between the interior entrance belt 720 and the exterior corner belt 810 includes an entrance conveyance path for the article 280. The interior entrance belt 720 is configured to move at the same linear velocity as the exterior corner belt 810, and thus to guide the article 280 into the transport cornering system 800.

In various embodiments, the exterior corner belt 810 is configured to move at approximately the same linear velocity as the interior entrance belt 720. In these embodiments, the interior entrance belt 720 and the interior turnstile wheel corner belt 710 and/or interior turnstile wheel surface 220 are configured to move at different linear velocities. In various embodiments, a distance between the interior entrance belt 720 and the exterior corner belt 810, defining a width of the entrance conveyance path, is less than a distance between the exterior corner belt 810 and the interior turnstile wheel corner belt 710 or interior turnstile wheel surface 220.

In various embodiments, the exit conveyance section 803 receives the article 280 from the curved conveyance section 801 and delivers the article 280 to a location disposed outside the transport cornering system 800. The exit conveyance section 803 comprises the exterior corner belt 810, a subset of the plurality of exterior corner belt guide wheels 235, an interior exit belt 730, and a plurality of interior exit belt guide wheels 735. The region between the interior exit belt 730 and the exterior corner belt 810 includes an exit conveyance path of the article 280. The interior exit belt 730 is configured to move at the same linear velocity as the exterior corner belt 810, and thus to guide the article 280 out of the transport cornering system 800.

In various embodiments, the exterior corner belt 810 is configured to move at approximately the same linear velocity as the interior exit belt 730. In these embodiments, the interior exit belt 730 and the interior turnstile wheel corner belt 710 and/or interior turnstile wheel surface 220 are configured to move at different linear velocities. In various embodiments, a distance between the interior exit belt 730 and the exterior corner belt 810, defining a width of the exit conveyance path, is less than a distance between the exterior corner belt 810 and the interior turnstile wheel corner belt 710 or interior turnstile wheel surface 220.

Figure 9A:
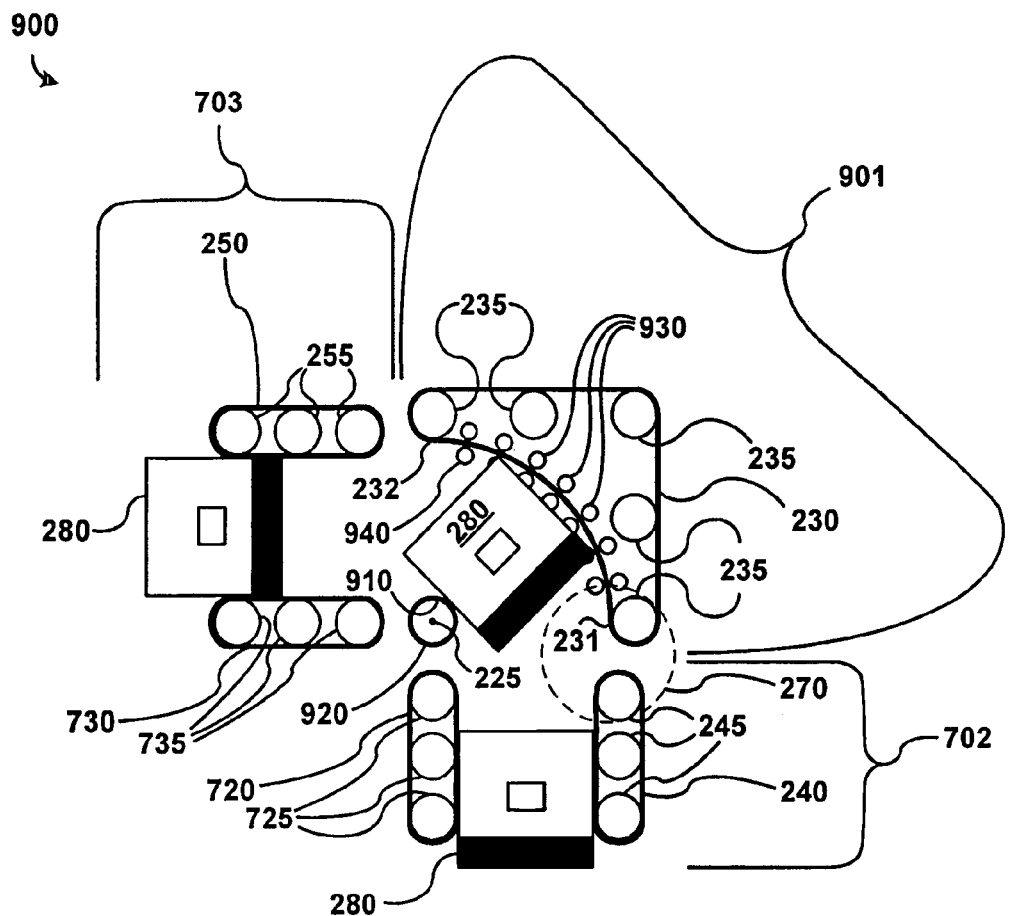
FIG. 9A illustrates a top view of a transport cornering system, according to various embodiments of the invention.

FIG. 9A illustrates a top view of a transport cornering system 900, according to various embodiments of the invention. The transport cornering system 900 is an alternative embodiment of the transport cornering systems 200, 700, and 800. In contrast with the embodiments of the present invention illustrated in the transport cornering systems 200, 700, and 800, embodiments of the present invention illustrated in the transport cornering system 900 do not comprise a turnstile wheel 210, but instead comprise a plurality of exterior corner guide wheels 930 and interior corner guide wheels 940 that guide and provide support to the exterior corner belt 230 from the first exterior curve point 231 to the second exterior curve point 232, and an interior corner wheel 910 and optionally an interior corner wheel belt 920 that guide the article 280 through the curved conveyance path instead of the interior turnstile wheel surface 220, the interior corner belt 260, and/or the interior turnstile wheel corner belt 710.

The configuration of transport cornering system 900 enables multiple instances of the transport cornering system 900 to be placed in closer proximity to one another, for example when the entrance conveyance sections 702 are adjacent to one another and the exit conveyance sections 703 are adjacent to one another, than transport cornering systems 200, 700, and 800 would allow due to the diameter of the turnstile wheel 210. In contrast with transport cornering systems 200, 700, and 800, the plurality of exterior corner guide wheels 930 and interior corner guide wheels 940 define a piece-wise linear path of the exterior corner belt 230 whereas the exterior turnstile wheel surface 215 defines a continuous curved path of the exterior corner belt 230 between the first exterior curve point 231 and the second exterior curve point 232.

The transport cornering system 900 comprises a curved conveyance section 901, an entrance conveyance section 702, and an exit conveyance section 703. The curved conveyance section 901 comprises an interior corner wheel 910 that rotates about the axis of rotation 225, the exterior corner belt 230, and the plurality of exterior corner belt guide wheels 235. The interior corner wheel 910 is optionally surrounded by an interior corner wheel belt 920. In embodiments comprising the interior corner wheel belt 920, the interior corner wheel belt 920 is configured to guide and/or support the article 280 as the article 280 traverses the curved conveyance section 901. In various embodiments, the interior corner wheel belt 920 is configured with approximately the same profile and construction as the interior corner belt 260 and/or the interior turnstile wheel corner belt 710 described elsewhere herein.

The region bounded by the interior corner wheel 910 or the interior corner wheel belt 920, the exterior corner belt 230, the first exterior curve point 231, and the second exterior curve point 232, includes a curved conveyance path for the article 280. The exterior corner belt 230 is disposed along an exterior edge of the curved conveyance path. The interior corner wheel 910 or the interior corner wheel belt 920 is disposed along an interior edge of the curved conveyance path. A plurality of the articles 280 may enter the transport cornering system 900 for transport through the curved conveyance path, passing between the interior corner wheel 910 and the exterior corner belt 230, and rotating about the axis of rotation 225.

In some embodiments, the plurality of exterior corner guide wheels 930 and interior corner guide wheels 940 are disposed along the exterior edge of the curved conveyance path on either side of the exterior corner belt 230 and configured to support and maintain a piece-wise linear curvature of the exterior corner belt 230 between the first exterior curve point 231 and the second exterior curve point 232.

In some embodiments, one or more of the exterior corner belt guide wheels 235 are configured to move the exterior corner belt 230 under power, while the interior corner wheel 910 is configured to rotate freely to provide guidance to the article 280 as the article 280 traverses the curved conveyance section. In other embodiments, the interior corner wheel 910 is configured to rotate under power such that an exterior surface of the interior corner wheel 910 or the interior corner wheel belt 920 moves at a same angular velocity about the axis of rotation 225 as the exterior corner belt 230 between the first exterior curve point 231 and the second exterior curve point 232. Therefore, the linear velocity of the exterior corner belt 230 is greater than the linear velocity of the interior corner wheel 910 and/or the interior corner wheel belt 920.

In various embodiments, the entrance conveyance section 702 receives the article 280 from a source disposed outside the transport cornering system 900 and delivers the received article 280 to the curved conveyance section 901. In various embodiments, the exit conveyance section 703 receives the article 280 from the curved conveyance section 901 and delivers the article 280 to a location disposed outside of the transport cornering system 900.

Figure 9B:
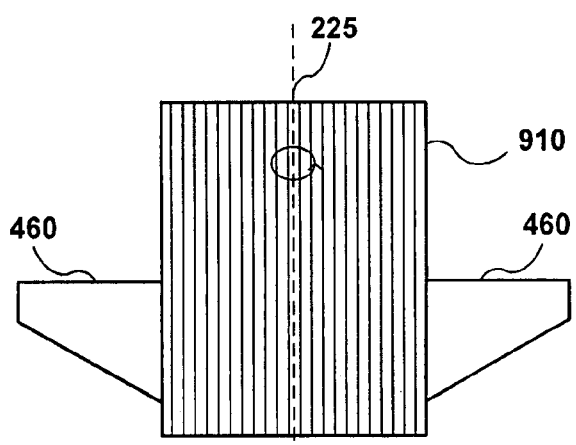
FIG. 9B illustrates a cross-sectional view of an interior corner wheel, according to various embodiments of the invention.

FIG. 9B illustrates a cross-sectional view of an interior corner wheel, according to various embodiments of the invention. In embodiments not comprising the interior corner wheel belt 920, the interior corner wheel 910 is configured to guide and/or support the article 280 as the article 280 traverses the curved conveyance section 901. In these embodiments, a plurality of support protrusions 460 are disposed on the interior corner wheel 910, the support protrusions 460 being configured to support the article 280.

Figure 9C:
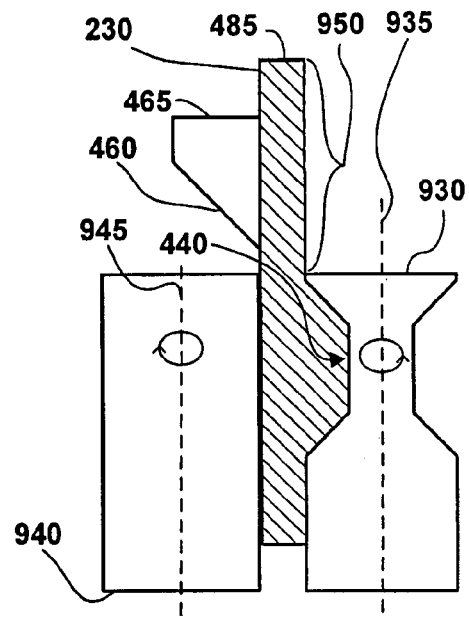
FIG. 9C illustrates a cross-sectional view of an exterior corner belt, an interior corner guide wheel, and an exterior corner belt guide wheel, according to various embodiments of the invention.

FIG. 9C illustrates a cross-sectional view of an exterior corner belt 230, an interior corner guide wheel 940, and an exterior corner guide wheel 930, according to various embodiments of the invention. The exterior corner guide wheels 930 and the interior corner guide wheels 940 are typically smaller in height and/or diameter than the exterior corner belt guide wheels 235, and are typically configured to support the exterior corner belt 230 on a lower portion of the vertical cross-section of the exterior corner belt 230 than the exterior corner belt guide wheels 235. A lower height of the exterior corner guide wheels 930 in relation to the height of the exterior corner belt 230 enables the exterior corner belt 230 to flex within a flexible region 950 and conform to the article 280 as the article 280 is guided through the curved conveyance section 901. The exterior corner guide wheels 930 are typically configured to rotate about a vertical axis 935, and the interior corner guide wheels 940 are typically configured to rotate about a vertical axis 945 in a direction of rotation opposite that of the exterior corner guide wheel 930.

Figure 10A:
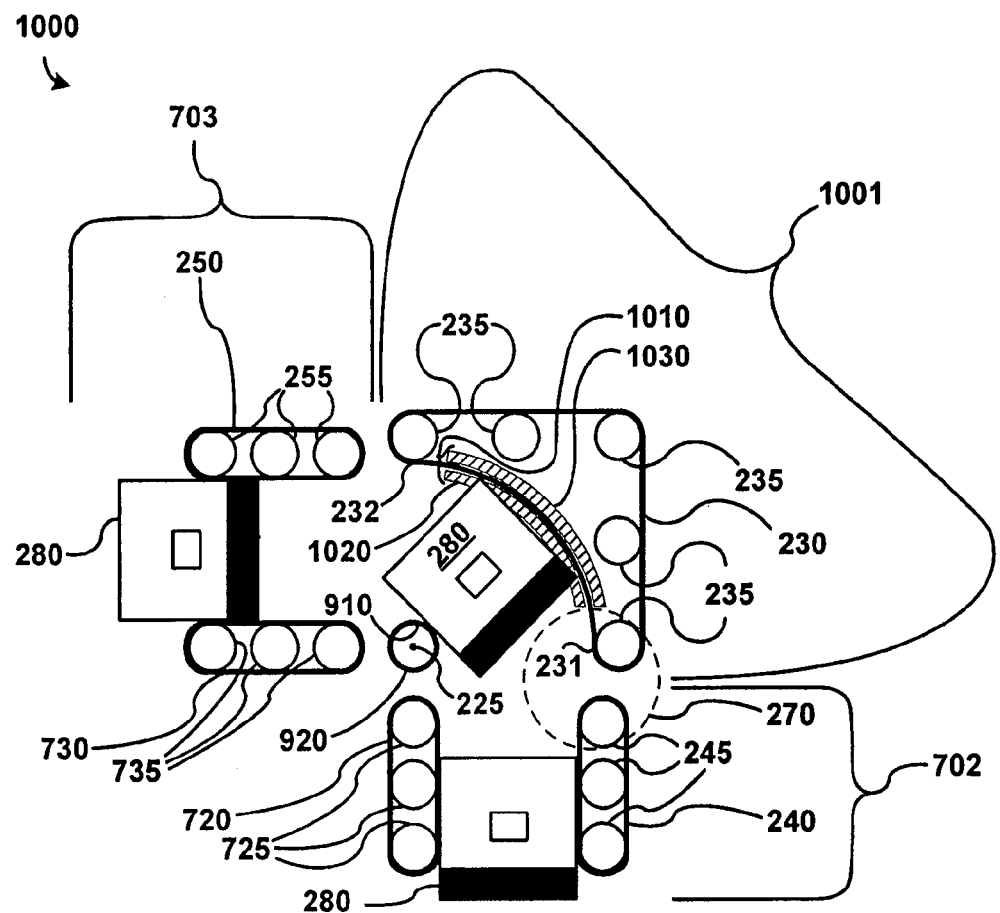
FIG. 10A illustrates a top view of a transport cornering system, according to various embodiments of the invention.

FIG. 10A illustrates a top view of a transport cornering system 1000, according to various embodiments of the invention. The transport cornering system 1000 comprises a curved conveyance section 1001, an entrance conveyance section 702, and an exit conveyance section 703. The transport cornering system 1000 is an alternative embodiment of the transport cornering system 900. In contrast with the embodiments of the present invention as illustrated in the transport cornering system 900, embodiments illustrated in the transport cornering system 1000 do not comprise a plurality of exterior corner guide wheels 930 and interior corner guide wheels 940, but instead comprise an exterior corner belt guide track 1010 that guides and provides support to the exterior corner belt 230 between the first exterior curve point 231 to the second exterior curve point 232. In contrast with the transport cornering system 900, the transport cornering system 1000 using the exterior corner belt guide track 1010 defines a continuous curved path of the exterior corner belt 230 whereas the plurality of exterior corner guide wheels 930 and interior corner guide wheels 940 define a piece-wise linear path of the exterior corner belt 230 between the first exterior curve point 231 and the second exterior curve point 232. Surfaces of the guide track 1010 that support the exterior corner belt 230 are configured to have low friction, and may comprise low-friction materials such as Teflon or may be coated with other lubricating liquids or materials such that the exterior corner belt 230 can slide within the guide track 1010 without binding.

The configuration of transport cornering system 1000 enables multiple instances of transport cornering systems 1000 to be placed in closer proximity to one another, for example when the entrance conveyance sections are adjacent to one another and the exit conveyance sections are adjacent to one another, than transport cornering systems 200, 700, and 800 would allow due to the diameter of the turnstile wheel 210.

In various embodiments, the curved conveyance section 1001 may comprise both an outside track rail 1030 and interior corner guide wheels 940 without an inside track rail 1020, or both an inside track rail 1020 and exterior corner guide wheels 930 without an outside track rail 1030.

Figure 10B:
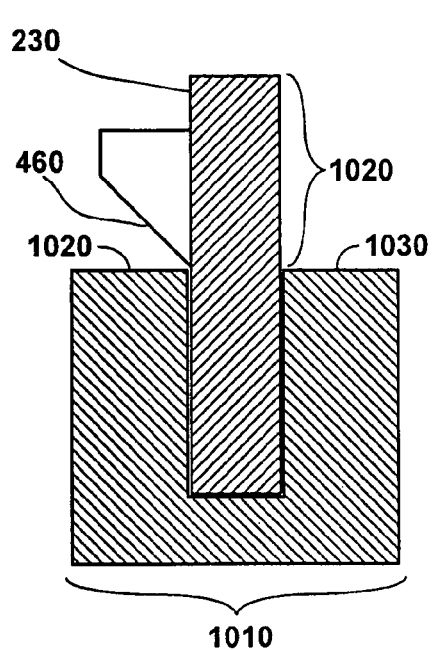
FIGS. 10B and 10C illustrate cross-sectional views of an exterior corner belt guide track, according to various embodiments of the invention.
Figure 10C:
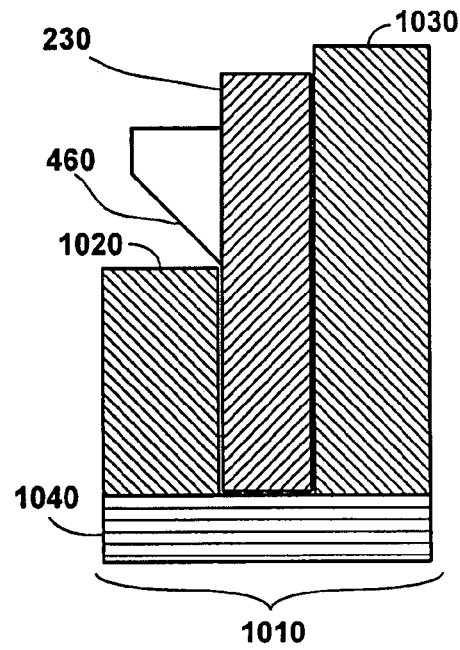

FIGS. 10B and 10C illustrate cross-sectional views of an exterior corner belt guide track, according to various embodiments of the invention. The exterior corner belt guide track 1010 comprises an outside track rail 1030 and an inside track rail 1020. The exterior corner belt guide track 1010 may comprise the outside track 1030 and the inside track 1020 as integral features or components as illustrated in FIG. 10B, or the exterior corner belt guide track 1010 may comprise the outside track rail 1030 and the inside track rail 1020 as separately disposed components which are configured to jointly guide the exterior corner belt 230, as illustrated in FIG. 10C. In some embodiments, a corner track support 1040 may be configured to support the exterior corner belt 230, the outside track rail 1030, and/or the inside track rail 1020. A lower height of the outside track rail 1030 in relation to a height of the exterior corner belt 230 may enable the exterior corner belt 230 to flex within a flexible region 1020 and conform to the article 280 as the article 280 is guided through the curved conveyance section 1001. In other embodiments, a comparable or larger height of the outside track rail 1030 in relation to the height of the exterior corner belt 230 may provide firmer support to the exterior corner belt 230 as the exterior corner belt 230 guides the article 280 through the curved conveyance section 1001.

FIG. 11 illustrates a top view of a conveyance section 702 configured to provide air bearings along an entrance conveyance path, according to various embodiments of the invention. The entrance conveyance section 702 comprises an exterior entrance belt 240 and an interior entrance belt 720. The entrance conveyance section 702 is configured to provide air bearings along the entrance conveyance path between the exterior entrance belt 240 and the interior entrance belt 720. The one or more air bearings are provided to additionally guide and/or support an article while the exterior entrance belt 240 and an interior entrance belt 720 guide the article in a conveyance direction 285. As illustrated in FIG. 11, region 1140 represents a location where such air bearings can be provided, either below or above the article. Exemplary air bearing generators for providing air bearings within region 1140 are described with respect to FIGS. 12A-12C.

In some embodiments, one or more air bearings are disposed between adjacent conveyance sections such as the entrance conveyance section 702 and the curved conveyance section 701. In these embodiments, the air bearings are typically configured to support an article as the article is transported between the entrance conveyance section 702 and the curved conveyance section 701 along a conveyance direction 285. One or more air bearings may be disposed as embodiments of support member 290, described with reference to FIG. 2C. While an exemplary deployment of air bearings in conjunction with entrance conveyance section 702 is described, air bearings may be disposed in various embodiments of conveyance sections as described elsewhere herein, such as those entrance conveyance sections, curved conveyance sections, and exit conveyance sections disposed within transport cornering systems 200, 700, 800, 900, and 1000.

An air bearing may serve as an air-cushion non-contact supporting system, as described in U.S. Patent Application Publication 2006/0054774 entitled "High-Performance Non-Contact Support Platforms" which is incorporated herein by reference. In some embodiments, a plurality of air bearings are provided proximate to one another and approximately in a line parallel to the conveyance direction 285 along the conveyance path. In other embodiments, a plurality of air bearings are provided proximate to one another and approximately in a line perpendicular to the conveyance direction 285 along the conveyance path. In still other embodiments, a plurality of air bearings are provided proximate to one another in two dimensional groupings. In additional embodiments, one or more air bearings are provided in irregular locations and patterns between interior entrance belt 720 and exterior entrance belt 240.

In some embodiments, the air bearings are configured to additionally support the article in a central region of the article between edges of the article that are supported by the interior entrance belt 720 and exterior entrance belt 240. In various embodiments, the article comprises a substrate including glass, polymer, or semiconductor material. The article may also comprise substrates for the manufacture of liquid crystal, organic light emitting diode or other types of display devices, a memory substrate (such as a hard drive platter substrate or an optical storage device substrate), a photovoltaic device substrate, a battery substrate, or the like. By supporting the central region of the article, the air bearings may reduce stress on the article, and prevent damage or breakage due to bending caused by uneven support across the width of the article between the exterior entrance belt 240 and the interior entrance belt 720. In some embodiments, the air bearings may support an article such as a substrate characterized by an area less than 1 square meter, between 1 square meter and 5 square meters, between 5 square meters and 6 square meters, or between 6 square meters and 7 square meters.

The air bearings may also reduce physical contact between the entrance conveyance section 702 and the article in comparison with alternative support members such as rollers, consequently reducing friction and vibration. Reduced contact and friction may also reduce contamination of the article and the ambient environment, for example by minimizing scrubbing of material contacting the article during transport.

FIGS. 12A, 12B, and 12C illustrate cross-sectional views of air bearing generators configured to generate the air bearings illustrated in FIG. 11. FIG. 12A illustrates various embodiments of an air bearing generator 1210. In these embodiments, the air bearing generator 1210 may be configured to generate an air bearing 1290 by generating an upward air stream 1220. The upward air stream 1220 forms the air bearing 1290 by providing physical support to the article when the article travels above the air bearing 1290 along the conveyance path. The air bearing generator 1210 may be configured to emit one or more air streams 1220 emanating from one or more holes in a tube or support member. A velocity and quantity of air within the one or more air streams 1220 determines a level of support provided by the one or more air streams 1220 to the article, such as a substrate.

The air bearing generator 1210 may optionally be configured to output a significantly reduced air stream 1220 or no air stream 1220 when the article is not in a path of the air stream 1220. For example, the air bearing generator 1210 may be configured to only output the air stream 1220 directly upward if the article is above the air bearing 1290, and to output a reduced air stream 1220 when there is no article above the air bearing 1290. In some embodiments, turbulent limited orifices, such as those described in U.S. Pat. No. 6,523,572 entitled "Apparatus for Inducing Forces by Fluid Injection" which is incorporated herein by reference, may be used to limit the air stream 1220 when there is no article above the air bearing 1290.

FIG. 12B illustrates an alternative embodiment of an air bearing generator 1230 utilizing ultrasonic levitation. U.S. Pat. No. 5,810,155 entitled "Object Levitating Apparatus Object Transporting Apparatus and Object Levitating Bearing Along with an Object Levitating Process and Object Transporting Process," which is incorporated herein by reference, discloses various embodiments of an object levitating apparatus using ultrasonic excitation. Ultrasonic levitation may typically be used to levitate an article, which may be characterized by thicknesses of approximately 1 mm to 2 mm, above a support surface 1240. Ultrasonic levitation uses ultrasonic waves generated between the support surface 1240 and the article to drive airflow into a space between the article and the support surface 1240, and to inhibit air from flowing out of the space between the article and the support surface 1240. In this way, the air bearing generator 1230 creates an air pressure differential between the article and the support surface 1240 compared to the ambient air pressure around the article. The air pressure differential creates an upward force 1250 that forms an air bearing 1290 that in turn levitates the article above the support surface 1240.

FIG. 12C illustrates alternative embodiments of an air bearing generator 1260 utilizing a Venturi vacuum support system. A Venturi vacuum support system supports an article such as a substrate from above rather than from underneath. As an air stream 1270 emanates downward through a Venturi nozzle disposed in the air bearing generator 1860, a vortex or Venturi is created in the center of the Venturi nozzle. The center of the Venturi or vortex is characterized by a lower air pressure than the ambient air pressure, thereby creating a localized vacuum and a suction force 1280 tending to lift the article upward toward the center of the Venturi nozzle. The air stream 1270 which escapes below the Venturi nozzle in the air bearing generator 1270 forms an air bearing 1290. The air bearing 1290 creates an equilibrium between the upward suction force 1280 and a downward force caused by the air stream 1270 emanating from the Venturi nozzle within the air bearing generator 1260. Several embodiments are specifically illustrated and/or described herein. However, it will be appreciated that modifications and variations are covered by the above teachings and within the scope of the appended claims without departing from the spirit and intended scope thereof. For example, while the transportation of FOUPs in semiconductor manufacturing have been used herein as an illustrative example, systems and methods of the invention may be configured for transporting alternative materials, such as for example, substrates for the manufacture of liquid crystal, organic light emitting diode or other types of display devices, a memory substrate (such as a hard drive platter substrate or an optical storage device substrate), a photovoltaic device substrate, a battery substrate, or the like.

Further, the vertical rollers and vertical belts discussed herein need not be perfectly vertical. The spacing of vertical rollers as illustrated herein is for illustrative purposes only. In various embodiments, vertical rollers may be disposed in a wide variety of spacings, from closely packed to widely separated including a single roller or rollers located only at each end of a belt. In various embodiments, the transport system may comprise straight, horizontal, inclined, and/or declined sections configured to deliver articles to or receive articles from the curved conveyance section.

In various embodiments, the curved conveyance sections 201, 701, 801, 901, and/or 1001 may transport articles along a continuously curved path through a turn of up to and including ten (10) degrees, up to and including forty-five (45) degrees, up to and including ninety (90) degrees, or up to and including one hundred eighty (180) degrees. In various embodiments, the curved conveyance sections 201, 701, 801, 901, and/or 1001 may be curved to the left or to the right of the initial conveyance path in the entrance conveyance sections 202, 702, and/or 802. In various embodiments, a transition region may be disposed between the curved conveyance sections 201, 701, 901, and/or 1001 and the exit conveyance sections 203 and/or 703. This transition region is substantially similar to the transition region 270 disposed between the entrance conveyance section 202 and the curved conveyance section 201. In some embodiments, the transport cornering systems 200, 700, 800, 900, and/or 1000 may be configured to transport a plurality of the articles 280 in both forward and backward directions by reversing the direction of rotation of the turnstile wheel 210, the plurality of exterior corner belt guide wheels 235, the plurality of interior corner belt guide wheels 265, the plurality of exterior exit belt guide wheels 255, the plurality of exterior entrance belt guide wheels 245, the plurality of interior entrance belt guide wheels 725, and the plurality of interior exit belt guide wheels 735, and/or other guide wheels as applicable. Each instance of the plurality of exterior corner belt guide wheels 235, the plurality of interior corner belt guide wheels 265, the plurality of exterior exit belt guide wheels 255, the plurality of exterior entrance belt guide wheels 245, the plurality of interior entrance belt guide wheels 725, the plurality of interior exit belt guide wheels 735, and/or other guide wheels may be different from other instances in its radius, height, profile, composition, or other physical characteristics.

In various embodiments, the transport cornering systems 200, 700, 800, 900, and/or 1000 are configured to transport at least 6, 12, 15, or 30 FOUPs per minute.

In various embodiments, the each of the various belts discussed herein may be replaced by two or more belts. Likewise, each of the various belts discussed herein may be replaced by a combination of belt(s) and guide wheel(s), the guide wheels configured to support a FOUP directly without use of a belt between the guide wheel and FOUP. In various embodiments, any one or more of the belts discussed herein are each supported by two, three, four, five, or more than five guide wheels. In various embodiments, any one or more of the belts discussed herein are horizontal rather than vertical belts In various embodiments, curved conveyance sections may not be horizontal. For example, a transport cornering system such as the transport cornering systems 200, 700, 800, 900, and 1000 may be banked in a manner similar to the configuration of tight curves and turns in race car tracks to improve guidance and support of articles being conveyed through the curved conveyance section.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A conveyance section for conveying an article along a curved conveyance path bounded by an interior curve and an exterior curve, the conveyance section comprising:
    an interior surface disposed proximate to a segment of the interior curve;
    an exterior corner belt supported by an external corner belt support structure and disposed proximate to a segment of the exterior curve; and
    a plurality of support protrusions disposed on the external corner belt and configured to support the article;
    the interior surface and the exterior corner belt configured to guide therebetween the article along the curved conveyance path such that an angular velocity of a first side of the article proximate to the segment of the interior curve is approximately equal to an angular velocity of a second side of the article proximate to the segment of the exterior curve.

2. The conveyance section of claim 1 wherein the exterior corner belt is a vertical belt and the external corner belt support structure comprises a plurality of vertical rollers.

3. A conveyance section for conveying an article along a curved conveyance path bounded by an interior curve and an exterior curve, the conveyance section comprising:
    an interior surface configured to rotate around an axis with an angular velocity, the interior surface disposed proximate to a segment of the interior curve;
    an exterior surface configured to rotate around the axis with the angular velocity, the exterior surface disposed proximate to a segment of the exterior curve;
    an exterior corner belt supported by the exterior surface and disposed proximate to the segment of the exterior curve;
    the exterior corner belt and the interior surface configured to guide therebetween the article along the curved conveyance path.

4. The conveyance section of claim 3 further comprising a turnstile wheel, wherein the turnstile wheel includes the exterior surface.

5. The conveyance section of claim 4 wherein the turnstile wheel also includes the interior surface.

6. The conveyance section of claim 3 further comprising an interior corner belt wherein the interior surface contacts one side of the interior corner belt and an opposite side of the interior corner belt is configured to support the article.

7. The conveyance section of claim 3 further comprising an entrance conveyance section configured to deliver the article to between the exterior corner belt and the interior surface at one end of the conveyance path.

8. The conveyance section of claim 7 wherein the entrance conveyance section includes a vertical belt.

9. The conveyance section of claim 3 further comprising a support structure configured to at least partially support the article.

10. The conveyance section of claim 9 wherein the support structure includes an air bearing generator.

11. The conveyance section of claim 9 wherein the support structure is magnetically coupled to a drive mechanism.

12. The conveyance section of claim 3 wherein the exterior corner belt includes a plurality of support protrusions configured to support the article.

13. The conveyance section of claim 3 further comprising the article, wherein the article comprises a FOUP including a semiconductor wafer.

14. The conveyance section of claim 13 wherein the FOUP has a lateral freedom of movement of 110 millimeters or less while being conveyed along the conveyance path.

15. The conveyance section of claim 3 further comprising the article, wherein the article comprises a substrate used for manufacturing a display device.

16. The conveyance section of claim 3 configured to operate at a conveyance rate of at least six articles per minute through the conveyance section.

17. A transport system comprising:
a straight conveyance section including two belts configured to transport an article therebetween; and
a curved conveyance section configured to receive the article from the straight conveyance section and convey the article along a curved conveyance path bounded by an interior curve and an exterior curve, the curved conveyance section including
a turnstile wheel configured to rotate around an axis with an angular velocity and having
an interior surface disposed proximate to a segment of the interior curve,
an exterior surface disposed proximate to a segment of the exterior curve, and
an exterior corner belt supported by the exterior surface and disposed proximate to the segment of the exterior curve.

18. The transport system of claim 17 wherein the belts of the straight conveyance section each include a plurality of support protrusions configured to support the article.

19. The transport system of claim 18 wherein the belts comprise vertical belts.

20. The transport system of claim 17 wherein the curved conveyance section further comprises a plurality of exterior corner belt guide wheels, wherein the exterior corner belt guide wheels are configured to contact one side of the exterior corner belt while the exterior surface contacts an opposite side of the exterior corner belt.

21. A method for conveying an article along a curved conveyance path bounded by an interior curve and an exterior curve, the method comprising:

rotating an interior surface with an angular velocity and proximate to a segment of the interior curve;
rotating an exterior surface with the angular velocity and proximate to a segment of the exterior curve;
moving an exterior corner belt around a continuous loop, the exterior corner belt being supported by the exterior surface and disposed proximate to the segment of the exterior curve;
providing the article to an end of the conveyance path between the exterior corner belt and the interior surface; and
guiding the article along the curved conveyance path between the exterior corner belt and the interior surface.

22. The method of claim 21 wherein rotating the interior and exterior surfaces comprises rotating a turnstile wheel that includes the interior and exterior surfaces.

23. The method of claim 21 wherein guiding the article along the curved conveyance path includes supporting the article on support protrusions extending from the interior surface and the exterior corner belt.

24. The method of claim 21 wherein guiding the article along the curved conveyance path includes supporting the article on support protrusions extending from the exterior corner belt and extending from an interior corner belt contacting the interior surface.

25. The method of claim 21 wherein guiding the article along the curved conveyance path is performed at the angular velocity.

* * * * *